(12) United States Patent
Vankadaru et al.

(10) Patent No.: US 10,606,627 B2
(45) Date of Patent: Mar. 31, 2020

(54) ALERTS ANALYSIS FOR A VIRTUALIZATION ENVIRONMENT

(71) Applicant: Nutanix, Inc., San Jose, CA (US)

(72) Inventors: Deepak Vankadaru, San Jose, CA (US); Hector Guillermo Cuellar Rios, San Jose, CA (US); Rajesh P. Bhatt, San Jose, CA (US); Ribao Wei, San Mateo, CA (US); Rohit Girme, San Jose, CA (US); Venkata Vamsi Krishna Kothuri, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 122 days.

(21) Appl. No.: 15/424,623

(22) Filed: Feb. 3, 2017

(65) Prior Publication Data

US 2017/0235596 A1     Aug. 17, 2017

Related U.S. Application Data

(60) Provisional application No. 62/294,995, filed on Feb. 12, 2016.

(51) Int. Cl.
*G06F 9/455*     (2018.01)
*G06F 16/951*     (2019.01)
(Continued)

(52) U.S. Cl.
CPC ...... *G06F 9/45558* (2013.01); *G06F 3/04847* (2013.01); *G06F 9/453* (2018.02);
(Continued)

(58) Field of Classification Search
CPC .... G06F 9/45558; G06F 9/5077; G06F 9/453; G06F 3/04847; G06F 17/30864; G06F 2009/45583
See application file for complete search history.

(56) References Cited

U.S. PATENT DOCUMENTS 8,549,518 B1    10/2013    Aron et al.
8,601,473 B1    12/2013    Aron et al.
(Continued)

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
(Continued)

*Primary Examiner* — Sisley N Kim
(74) *Attorney, Agent, or Firm* — Foley & Lardner LLP

(57) ABSTRACT

Particular embodiments provide a system comprising a cluster of host machines for managing communication connections in a virtualization environment. Implementing a virtualization environment, each of the host machines may comprise a hypervisor, a user virtual machine (UVM), and an I/O controller. A virtual disk may include a plurality of storage devices, wherein the I/O controllers conduct I/O transactions with the virtual disk based on I/O requests received from the UVMs. A management module may implement a monitoring policy of rules associated with an operating status of components of the virtualization environment. The management module may receive data associated with the operating status of the components. In response to determining that the data associated with the operating status satisfies one or more rules in the monitoring policy, the management module may initiate an alert and also display a graphical user interface that includes a root cause analysis of the alert.

15 Claims, 26 Drawing Sheets

(51) Int. Cl.
*G06F 11/34* (2006.01)
*G06F 11/32* (2006.01)
*G06F 3/0484* (2013.01)
*G06F 9/451* (2018.01)

(52) U.S. Cl.
CPC ........ *G06F 11/324* (2013.01); *G06F 11/3452* (2013.01); *G06F 11/3495* (2013.01); *G06F 16/951* (2019.01); *G06F 2009/45583* (2013.01); *G06F 2201/815* (2013.01)

(56) References Cited

U.S. PATENT DOCUMENTS

| | | |
|---|---|---|
| 8,850,130 B1 | 9/2014 | Aron et al. |
| 8,863,124 B1 | 10/2014 | Aron |
| 9,317,452 B1 | 4/2016 | Forschmiedt et al. |
| 9,703,584 B2 | 7/2017 | Kottomtharayil et al. |
| 9,772,866 B1 | 9/2017 | Aron et al. |
| 9,929,969 B1 | 3/2018 | Krottapalli et al. |
| 10,044,556 B2 | 8/2018 | Zhou |
| 2007/0248017 A1 | 10/2007 | Hinata et al. |
| 2008/0140817 A1* | 6/2008 | Agarwal ............. H04L 41/0677 709/223 |
| 2011/0023031 A1 | 1/2011 | Bonola et al. |
| 2012/0011517 A1 | 1/2012 | Smith et al. |
| 2013/0247133 A1 | 9/2013 | Price et al. |
| 2014/0059228 A1* | 2/2014 | Parikh .................. G06F 9/5005 709/226 |
| 2014/0146648 A1 | 5/2014 | Alber et al. |
| 2015/0220324 A1 | 8/2015 | Arcese et al. |
| 2015/0326531 A1* | 11/2015 | Cui ...................... H04L 63/029 726/3 |
| 2015/0356773 A1 | 12/2015 | Kumar et al. |
| 2016/0104076 A1* | 4/2016 | Maheshwari .......... G06N 20/00 706/12 |
| 2016/0104093 A1* | 4/2016 | Fletcher ........... G06Q 10/06393 705/7.39 |
| 2016/0147631 A1 | 5/2016 | Magdon-Ismail et al. |
| 2016/0378389 A1* | 12/2016 | Hrischuk .............. G06F 3/0631 711/154 |
| 2017/0070414 A1* | 3/2017 | Bell ....................... H04L 43/16 |
| 2017/0116014 A1 | 4/2017 | Yang et al. |
| 2017/0149644 A1 | 5/2017 | Rapoport et al. |
| 2017/0214737 A1* | 7/2017 | Agarwal .............. G06F 9/45558 |
| 2018/0157513 A1 | 6/2018 | Deodhar et al. |

OTHER PUBLICATIONS

Poitras, Steven. "The Nutanix Bible" (Jan. 12, 2016), from https://nutanixbible.com/.

Poitras, Steven. "The Nutanix Bible" (Oct. 15, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 3, 2017), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Cano et al., (Curator: Self-Managing Storage for Enterprise Clusters), https://www.usenix.org/conference/nsdl17/, Mar. 27, 2017, pp. 1-16.

* cited by examiner

| APOLLO-ESX | HO | ALERT POLICIES | | | | ? \| X | ADMIN |

CONFIGURE ALERT POLICIES WHICH CONTROL WHEN AND HOW ALERTS ARE GENERATED

| SEARCH BY TITLE | | | | THRESHOLD DETAILS | | |
|---|---|---|---|---|---|---|
| ID | TITLE | CATEGORY | SEVERITY | ENABLED | VALUE | DEFAULT VALUE |
| A1001 | CVM CONNECTIVITY FAILURE | | CRITICAL | YES | | 90% |
| A1003 | PROTECTION DOMAIN REPLICATION EXPIRED | | WARNING | YES | | 75% |
| A1005 | DATA DISK SPACE USAGE HIGH | HOST | | | DEFAULT | ARDING MODE (1) AGO |
| A1006 | HOST IP NOT REACHABLE | HOST | | | DEFAULT | DE (1) |
| A1008 | IPMI IP ADDRESS MISMATCH | HOST | | | DEFAULT | ARDING MODE (1) |
| A1009 | CVM IP ADDRESS MISMATCH | HOST | | | DEFAULT | EATURE VIOLATION (1) RENCE HIGH (1) |
| A1010 | PROTECTED VM NOT FOUND | PROTECTION DOMAIN | | | DEFAULT | EATURE VIOLATION (1) RENCE HIGH (1) |

CLOSE

HOME  EXPLORE  ANALYSIS  ALERTS (1016)  ADMIN

MAIN DASHBOARD  |  WIDGETS

IMPACTED CLUSTER

PRISM CENTRAL

ALERT POLICIES  ? | X

CONFIGURE ALERT POLICIES WHICH CONTROL WHEN AND HOW ALERTS ARE GENERATED.

SEARCH BY TITLE

| ID | TITLE | CATEGORY | ENTITY TYPE | GLOBAL RULE | EXCEPTION | |
|---|---|---|---|---|---|---|
| A1001 | CVM CONNECTIVITY FAILURE | | CLUSTER | DEFAULT | 0 | ✎ |
| A1003 | PROTECTION DOMAIN REPLICATION EXPIRED | | PROTECTION DOMAIN | DEFAULT | 0 | ✎ |
| A1005 | DATA DISK SPACE USAGE HIGH | | HOST | DEFAULT | 1 | ✎ |
| A1006 | HOST IP NOT REACHABLE | | HOST | DEFAULT | 0 | ✎ |
| A1007 | INTEL SSD TEMPERATURE HIGH | | DISK | DEFAULT | 0 | ✎ |
| A1008 | IPMI IP ADDRESS MISMATCH | | HOST | DEFAULT | 0 | ✎ |
| A1009 | CVM IP ADDRESS MISMATCH | | HOST | DEFAULT | 0 | ✎ |

CLOSE

ALERTS  PER  CAP  CONF

CLUSTER CPU USAGE
APOLLO-ESX  7.72%

DETAILS

HOME EXPLORE ANALYSIS ALERTS (10016) ⊙ ② ⚙ ? ⚙ ADMIN

MAIN DASHBOARD + ADD WIDGETS

ALERT EMAIL CONFIGURATION ? | ✕

SETTINGS • RULES • TEMPLATE

WHEN:
SEVERITY                CATEGORY

ALL ▽                   CATEGORY ▽
CRITICAL
WARNING                 CATEGORY ▽
INFO

SEND TO:
EMAIL ADDRESSES
RECIPIENT EMAIL

☐ GLOBAL RECIPIENT LIST ⓘ

CANCEL  APPLY

HOME  EXPLORE  ANALYSIS  ALERTS (10016)  ◎ ②

⚙ ALERT POLICY    ⚙ EMAIL CONFIGURATION

SORT BY : CREATE TIME ✕    SEVERITY : CRITICAL ✕    RESOLVED : NO ✕

| | | | | |
|---|---|---|---|---|
| ☐ | DISK SPACE USAGE HIGH ON /DEV/SDC 10.4.45.54 | CAPACITY | ● CRITICAL | 02/04/2016, 03:44 PM | APOLLO-ESX |
| ☐ | KERNEL MEMORY USAGE HIGH | SYSTEM INDICATOR | ● CRITICAL | 02/04/2016, 03:14 PM | APOLLO-ESX |
| ☐ | SMTP ERROR | CONFIGURATION | ● CRITICAL | 02/04/2016, 03:11 PM | APOLLO-ESX |
| ☐ | KERNEL MEMORY USAGE HIGH | SYSTEM INDICATOR | ● CRITICAL | 02/04/2016, 03:10 PM | APOLLO-ESX |
| ☐ | KERNEL MEMORY USAGE HIGH | SYSTEM INDICATOR | ● CRITICAL | 02/04/2016, 03:10 PM | APOLLO-ESX |
| ☐ | CASSANDRA IN FORWARDING MODE | SYSTEM INDICATOR | ● CRITICAL | 02/03/2016, 12:24 PM | APOLLO-ESX |
| ☐ | CONTROLLER VM 10.4.45.56 REBOOTED | SYSTEM INDICATOR | ● CRITICAL | 02/02/2016, 05:24 PM | APOLLO-ESX |
| ☐ | CONTROLLER VM 10.4.45.54 REBOOTED | SYSTEM INDICATOR | ● CRITICAL | 02/02/2016, 05:18 PM | APOLLO-ESX |
| ☐ | SMTP ERROR | CONFIGURATION | ● CRITICAL | BY ADMIN (02-02, 01:19:59 PM) 02/01/2016, 03:38 PM | PRISM CENTRAL |
| ☐ | CONTROLLER VM 10.4.45.54 DISCONNECTED FROM NETWORK | AVAILABILITY | ● CRITICAL | 01/28/2016, 10:41 PM | APOLLO-ESX |

ADMIN

▼ FILTERS

FIG. 21

CONTROLLER VM 10.4.45.56... ∨

SUMMARY

| | |
|---|---|
| ALERT | CONTROLLER VM 10.4.45.56 REBOOTED |
| SEVERITY | ● CRITICAL |
| CLUSTER NAME | APOLLO-ESX |
| CLUSTER VERSION | 4.6 |
| CREATED TIME | 5:24AM 02/02/2016 |
| LAST OCCURRED | 5:24AM 02/02/2016 |
| CATEGORY | SYSTEM INDICATOR |
| STATUS | - |
| ACKNOWLEDGED BY | - |
| RESOLVED BY | - |
| AFFECTED ENTITIES | HOST |

CAUSE 1
CONTROLLER VM WAS INTENTIONALLY REBOOTED.

RECOMMENDATION
IGNORE THE ALERT IF INTENTIONAL

CAUSE 2
CONTROLLER VM OUT OF MEMORY CAUSING KERNEL PANIC.

RECOMMENDATION
CONTACT NUTANIX SUPPORT

DETAILS
REVIEW /HOME/LOG/MESSAGES, CVM KERNEL MESSAGE AND HYPERVISOR MESSAGE TO IDENTIFY THE ISSUE AROUND THE TIME THE NODE WAS BEING REBOOTED. SEE IF THERE IS ANY KERNEL PANIC MESSAGE.

DESCRIPTION
FREE MEMORY IN KB ■ NTNX-14SM12380009-C

RESOLVE | ACKNOWLEDGE  ? | ×

FIG. 22

ALERTS ANALYSIS FOR A VIRTUALIZATION ENVIRONMENT

PRIORITY

This application claims the benefit, under 35 U.S.C. § 119(e), of U.S. Provisional Patent Application No. 62/294,995, filed 12 Feb. 2016, which is incorporated herein by reference.

TECHNICAL FIELD

This disclosure generally relates to graphical user interfaces and alerts in a virtualization environment.

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical computing devices, and can result in reduced redundancies and better resource cost management.

Furthermore, certain virtualization environments may not only utilize the processing power of the physical computing devices, but also to aggregate storage capacity across the individual physical computing devices to create a logical storage pool wherein the data is distributed across the physical computing devices, yet appears to the virtual machines to be part of the system that the virtual machine is hosted on. Such systems may utilize metadata, which may be distributed and replicated any number of times across the system, to locate specific data within the logical storage pool. These systems are commonly referred to as clustered systems, wherein the resources of the group are pooled to provide logically combined, but physically separate systems.

SUMMARY OF PARTICULAR EMBODIMENTS

Particular embodiments provide an architecture for implementing a graphical user interface ("GUI") and a framework for enabling alert configuration for entities and/or resources in a virtualization environment. Particular embodiments may also provide mechanism to modify the alert configuration on a per-cluster basis to suit the requirements of a cluster. The framework may comprise a central module for storing and managing information about alerts, as well as handling alerts, and a number of element modules on the nodes for implementing alerts, handling alerts, and sending status information back to the central module. The framework may determine when and whether to generate an alert, what severity level has been triggered, and what should be done once an alert has been generated. Information triggering alerts may come from any number of sources or services in the virtualization environment. The central module and/or the element modules may assess the information (e.g., the fan speed is high, which means that it may be getting too hot; or the disk usage is getting high, which means that one or more nodes may be approaching the capacity limit), then determine what action to take. In particular embodiments, the framework may provide default values for alert rules, as well as the ability to establish exceptions to the default values. In particular embodiments, the GUI may group together similar exceptions, and such exceptions may be configured on a per-cluster, per-entity, or per-resource basis. Specific clusters, elements, and/or resources may be associated with existing or new exceptions from a centralized location, on a per-alert basis. Particular embodiments may facilitate exploring various time series metrics which can help in analyzing an alert. Particular embodiments may gather all relevant metrics and present the information in a single GUI.

Particular embodiments may provide a rule-based mechanism to send out notifications (e.g., by email) when an alert is triggered. Particular embodiments may provide a subscription mechanism to enable end-users (e.g., systems administrators) to subscribe to different categories or types of alerts. The recipients of these notifications (e.g., a global recipient list) may be specified via a GUI and/or by command-line entry or a script. Particular embodiments provide a notification rule mechanism to subscribe to alert notifications based on the severity, category and originating cluster (in case of the central module). Multiple rules may be specified. When an alert is raised, the notification is sent to recipients of all rules that match the severity, category and cluster criteria. If none of the rules match, the notification is sent by default to the global recipient list. In particular embodiments, the end-user may be able to modify the order in which the notification subscription rules are applied. In addition, end-users may be able to terminate further rule processing if any rule matches with an alert.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8 illustrates values for an alert policy of a particular cluster, wherein the values are set to "Default" settings.

FIG. 10 illustrates values for an alert policy of a particular cluster, wherein the default values have been "Overridden" and are now set to the user-configured values.

FIG. 12 illustrates a GUI to search for/browse through existing alert policies in the central module.

FIG. 13 illustrates a GUI to update an alert policy for a global rule from the central module.

FIG. 14 illustrates the GUI of FIG. 13, updated from the central module to add a cluster-based exception where only critical-level alerts are provided (and not warning-level alerts).

FIG. 16 illustrates a GUI to configure the new notification subscription rule in the central module.

FIG. 17 illustrates selection of a severity level for the new notification subscription rule in the central module.

FIG. 18 illustrates a display with several values configured for the new notification subscription rule in the central module.

FIG. 21 illustrates a GUI listing several alerts in the central module, wherein the list of results was generated by sorting and filtering through the larger list.

FIG. 22 illustrates a GUI displaying information about an alert and root cause analysis results for the alert.

DESCRIPTION OF EXAMPLE EMBODIMENTS

Figure 1A:
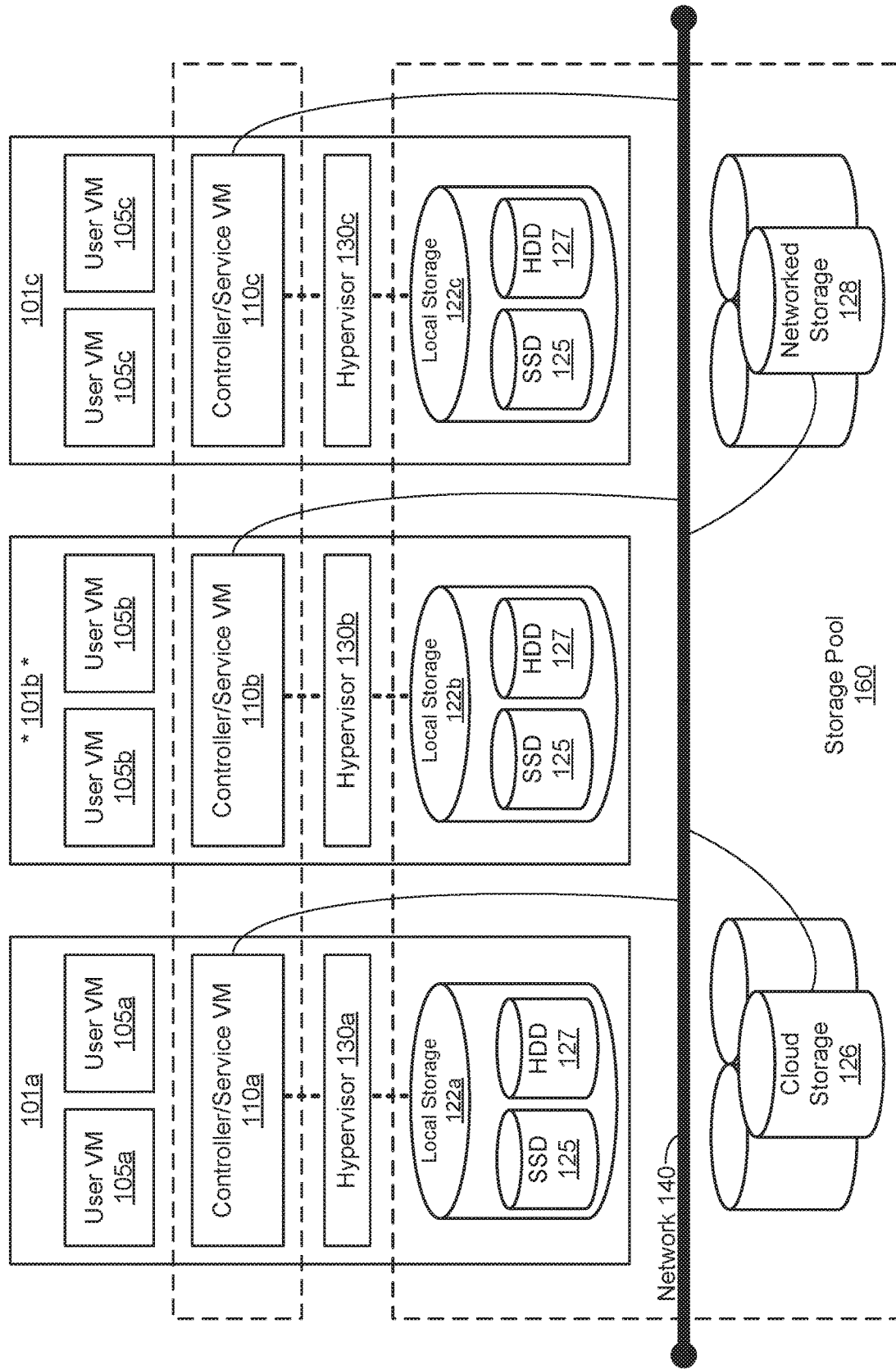
FIG. 1A illustrates a clustered virtualization environment according to particular embodiments of the invention.

FIG. 1A illustrates a clustered virtualization environment 100 according to particular embodiments. The architecture of FIG. 1A can be implemented for a distributed platform that contains multiple host machines 101a-c that manage multiple tiers of storage. The multiple tiers of storage may include storage that is accessible through network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122a-c that is incorporated into or directly attached to the host machine and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 101a-c may run virtualization software, such as VMWARE ESX(I), MICROSOFT HYPER-V, REDHAT KVM, or NUTANIX AHV. The virtualization software includes hypervisor 130a-c to create, manage, and destroy user VMs 105, as well as managing the interactions between the underlying hardware and user VMs 105. User VMs 105 may run one or more applications that may operate as "clients" with respect to other elements within virtualization environment 100. Though not depicted in FIG. 1A, a hypervisor may connect to network 140. In particular embodiments, a host machine 101 may be a physical hardware computing device; in particular embodiments, a host machine 101 may be a virtual machine.

CVMs 110a-c are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101b, as indicated by the asterisks, may be a leader node. A leader node may have a software component designated to perform operations of the leader. For example, CVM 110b on host machine 101b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 105a-c. These disks are virtual, since they are implemented by the software running inside CVMs 110a-c. Thus, to user VMs 105a-c, CVMs 110a-c appear to be exporting a clustered storage appliance that contains some disks. All user data (including the operating system) in the user VMs 105a-c and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
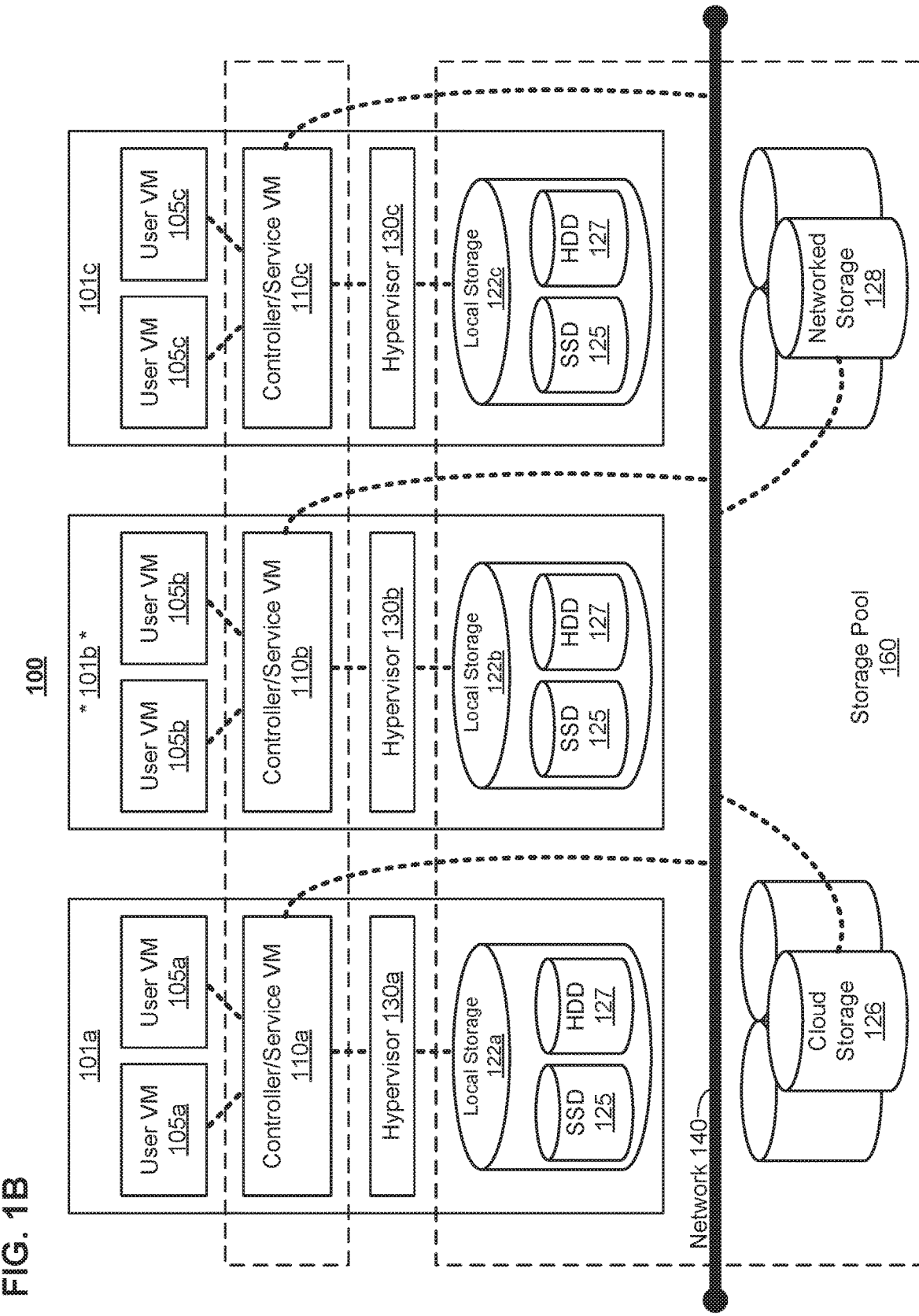
FIG. 1B illustrates data flow within a clustered virtualization environment according to particular embodiments of the invention.

FIG. 1B illustrates data flow within an example clustered virtualization environment 100 according to particular embodiments. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations. CVM 110a-c may be connected to storage within storage pool 160. CVM 110a may have the ability to perform I/O operations using local storage 122a within the same host machine 101a, by connecting via network 140 to cloud storage 126 or NAS 128, or by connecting via network 140 to local storage 122b-c within another host machine 101b-c (e.g., via connecting to another CVM 110b or 110c). In particular embodiments, any suitable computing system 1300 may be used to implement a host machine 101.

In particular embodiments, the clustered virtualization environment may include a distributed entity database for storing datacenter entities and the relationships between them, as represented by an entity-relationship graph. An entity database may support such an entity-relationship model by storing information related to the entity-relationship graph, such as entities, entity relationships, and time series information and statistics. The database may be sharded (a.k.a. distributed) across multiple nodes, and may have a query model optimized for the entity-relationship model that supports querying current and historical data, queries for keyword searches, watches for notifying clients on entity updates, and synchronization of data between database instances.

Figure 2:
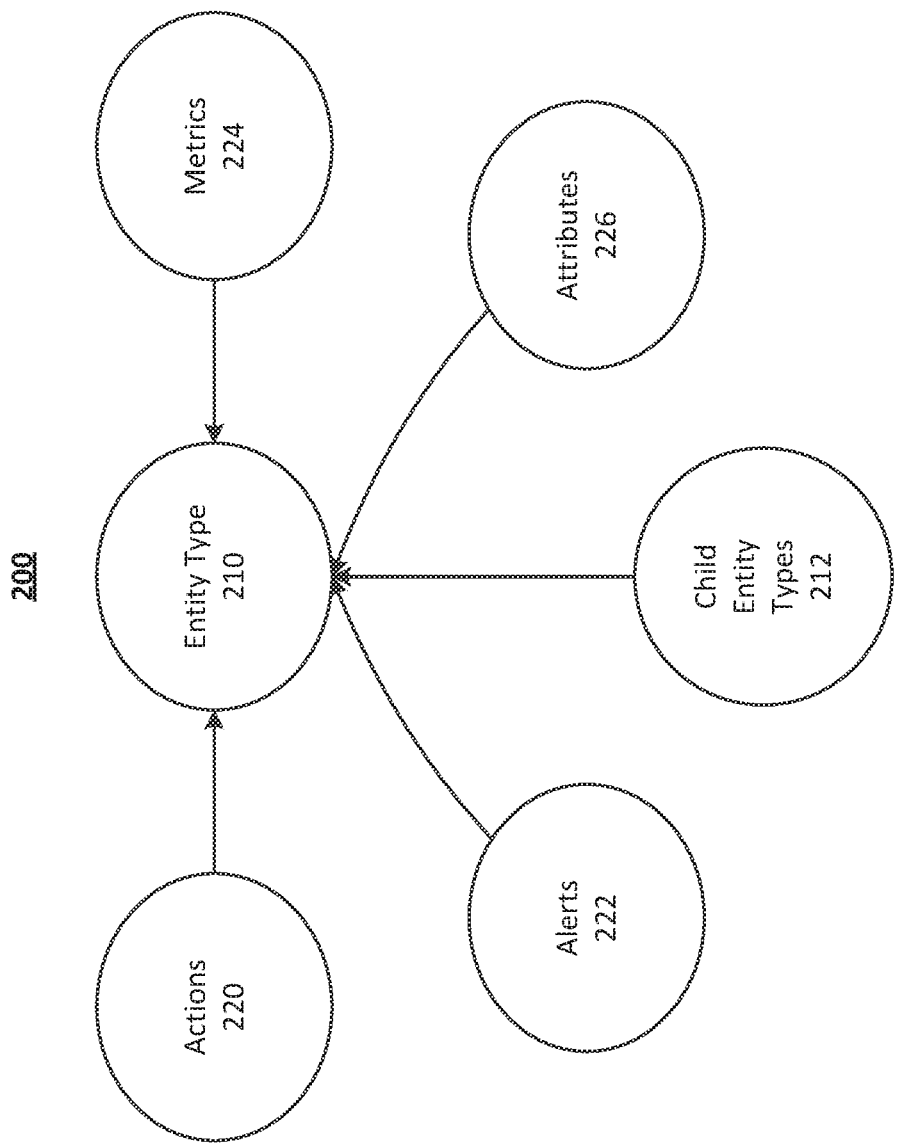
FIG. 2 illustrates the basic pattern of an entity relationship graph according to some embodiments of the invention.

FIG. 2 illustrates the basic pattern of an entity-relationship graph 200, which may comprise an entity-type node 210 (e.g., a parent entity-type node) connected to a child entity-type node 212. In addition, a plurality of activity-type nodes may be connected to entity-type node 210, including an action-type node 220, an alert-type node 222, a metrics-type node 224, and an attributes-type node 226. As an example and not by way of limitation, each entity-type node (e.g., entity type node 210, child entity-type node 212, etc.) is connected to at least one of the activity-type nodes. For simplicity, only one node is shown in the basic structure of the entity-relationship graph 200, but this disclosure contemplates that each node type can comprise one or more nodes of that node type.

The schema of an entity-relationship graph (including relationships between entities) may be defined at runtime, and the entity-relationship graph may dynamically evolve as conditions change. As illustrated, each entity may have its own properties; in particular embodiments, each entity may also inherit properties from related entities (e.g., inheriting available actions from a parent or inheriting a contribution to metrics data from a child entity node). Values for different attributes and/or metrics data for an entity may be generated by different sources (e.g., different services running in the virtualization environment and/or other entities). Particular entities may retain historical data relating to changes in its properties and/or metrics data (e.g., tracked statistical information). Such historical data may be retained together with timestamp information so that the evolving state of the virtualization environment is captured in an entity trail, as discussed further in relation to FIG. 5.

Figure 3A:
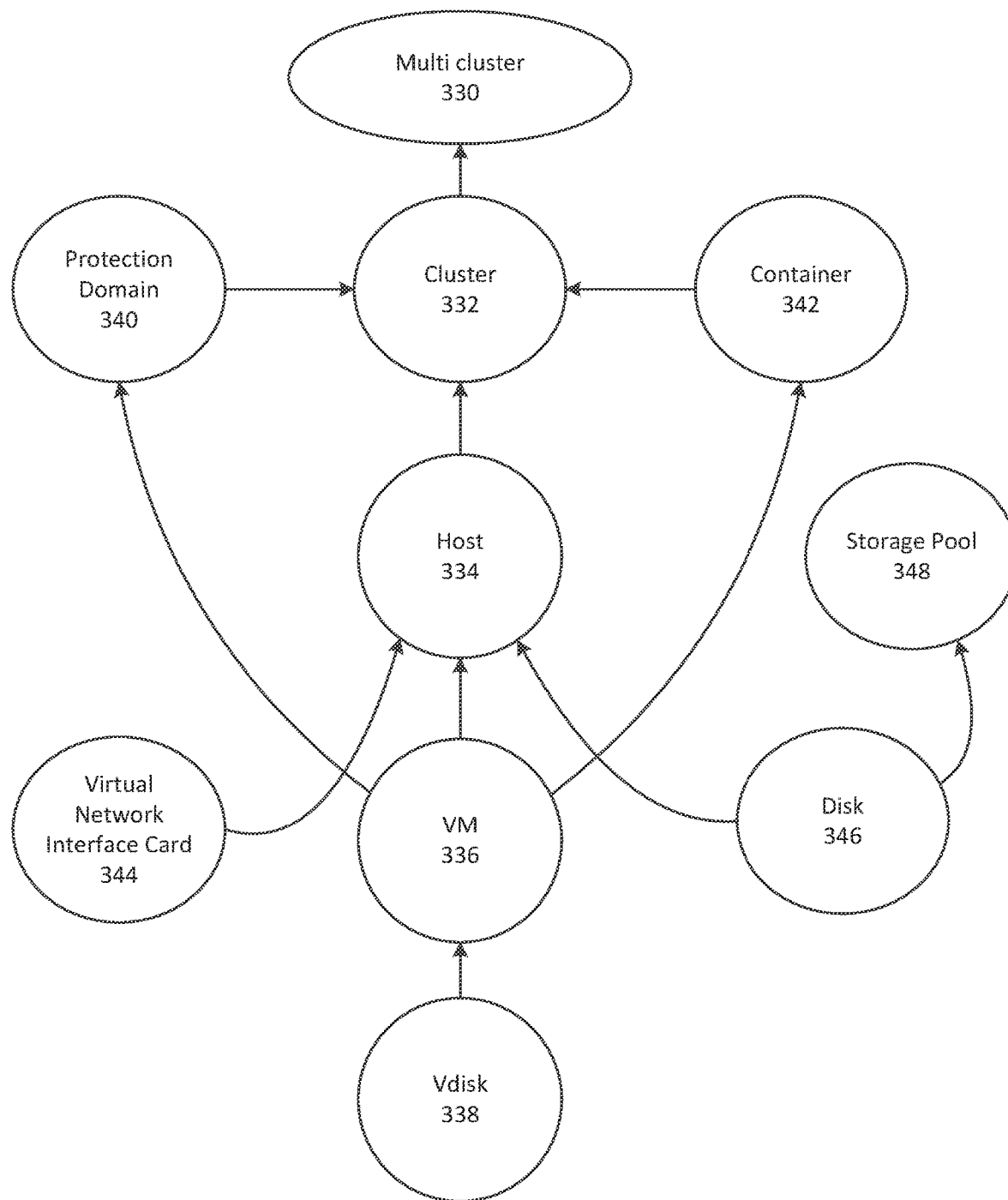
FIG. 3A illustrates an example entity-relationship graph for entities associated with a virtualization system according to some embodiments of the invention.

FIG. 3A illustrates an example entity-relationship graph 300 for entities associated with virtualization system 100. As shown in FIG. 3A, entity-type nodes may include a multi-cluster-type node 330, a cluster-type node 332, a host-type node 334, a virtual-machine-type node 336, a virtual-disk-type node 338, a protection-domain-type node 340, a container-type node 342, a network-interface-card-type node 344, a disk-type node 346, and a storage-pool-type node 348. In particular embodiments, the direction of the edge connecting the nodes indicates a child-parent relationship (e.g., the arrow goes from a child node to a parent node). As an example and not by way of limitation, cluster-type node 332 is a child node of multi-cluster-type node 330 and the parent node of protection-domain-type node 340 and container-type node 342. As another example and not by way of limitation, virtual-machine-type node 336 is a child node of protection-domain-type node 340, host type node 336, and container-type node 342, and a parent node of virtual-disk-type node 338.

Figure 3B:
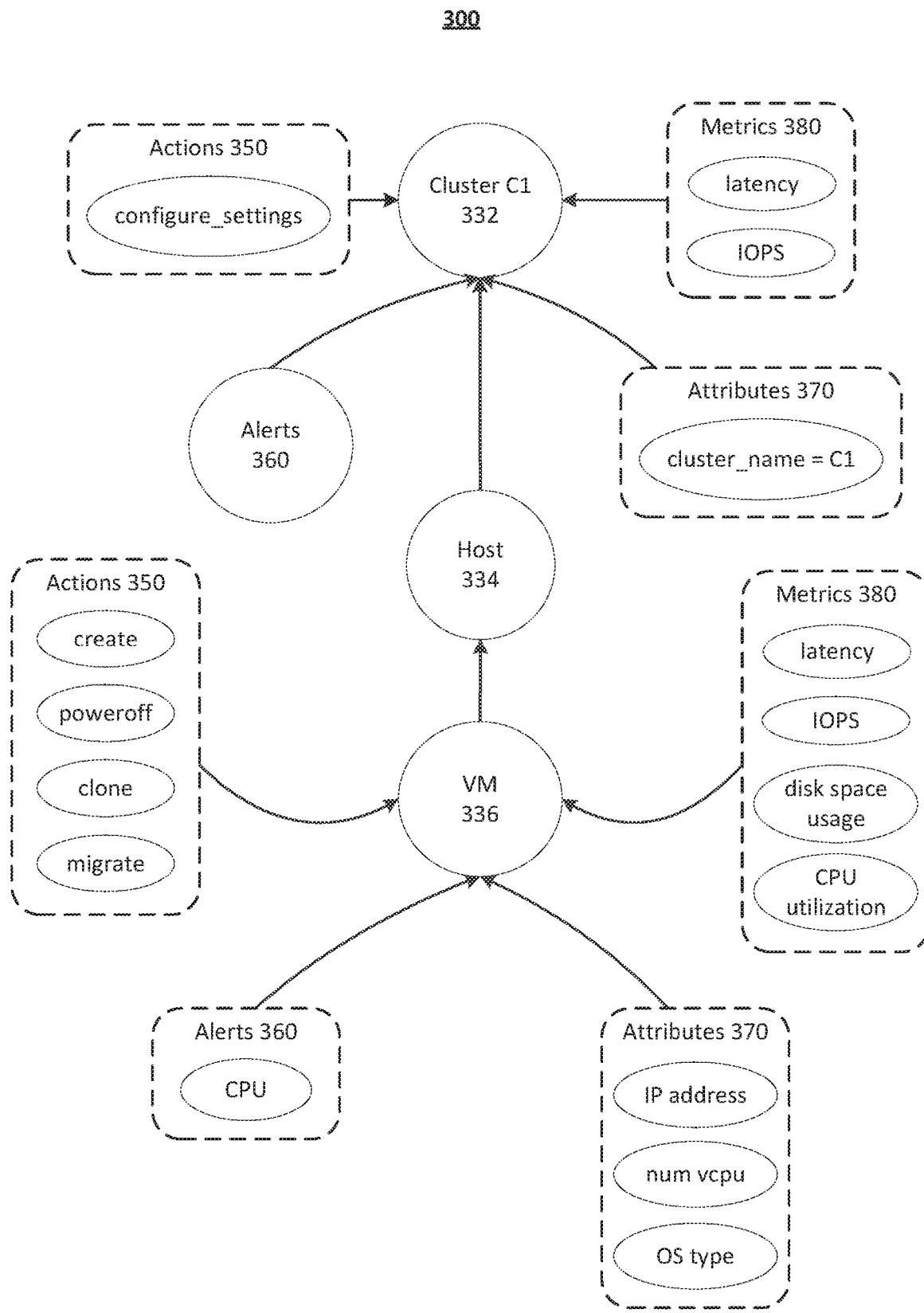
FIG. 3B illustrates another example entity-relationship graph for entities associated with a virtualization system according to some embodiments of the invention.

FIG. 3B illustrates another example entity-relationship graph 300 for entities associated with virtualization system 100, together with example attributes, actions, metrics, alerts, and other information associated with the entities. As an example and not by way of limitation, cluster-type node 332 may be associated with action-type nodes 350 (e.g., settings, etc.), alert-type nodes 360, attribute-type nodes 370 (e.g., cluster name "C1") and metric-type nodes 380 (e.g., I/O operations per second ("IOPS"), latency, etc.). As another example and not by way of limitation, virtual-machine-type node 336 may be associated with action-type nodes 350 (e.g., create, poweroff, clone, migrate, etc.), alert-type nodes 360 (e.g., alert types such as cpu, etc.), attribute-type nodes 370 (e.g., num vcpu, IP address, OS type, etc.), and metric-type nodes 380 (e.g., IOPS, latency, CPU utilization, diskspace usage, etc.).

Figure 4:
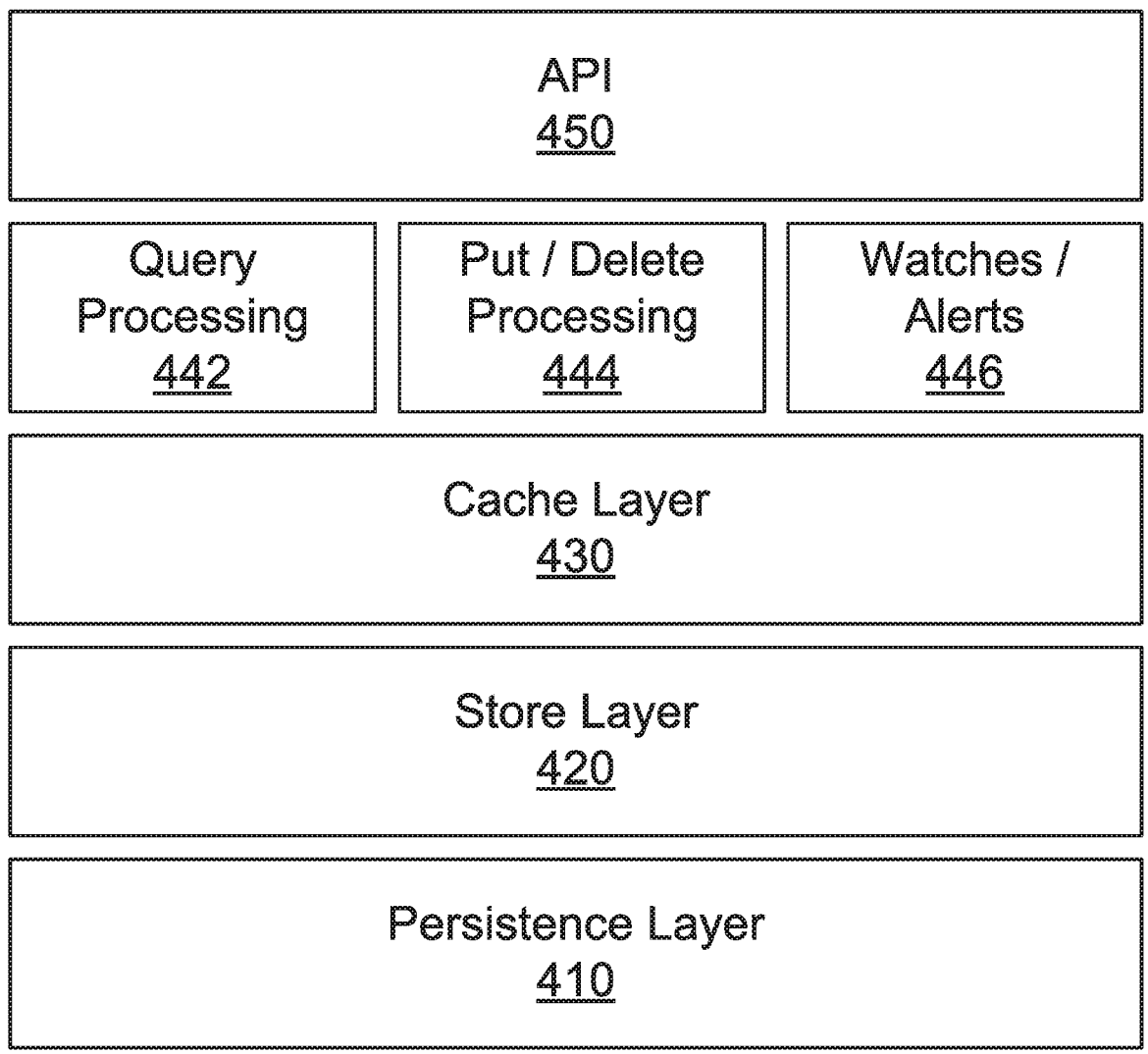
FIG. 4 illustrates an example architecture for an entity database according to some embodiments of the invention.

FIG. 4 illustrates an example architecture for the entity database. The architecture may comprise a Cache Layer 430 on top of a Store Layer 420 on top of a Persistence Layer 410 (e.g., underlying database and/or volume groups in the storage pool). The architecture may support a query processing process 442, put/delete processing process 444, and watches/alerts process 446. The architecture may also expose functionality via an API 450. Persistence Layer 410 may comprise persistent non-volatile storage of the database information. Cache Layer 430 may comprise storage of information that is expected to be retrieved frequently or in a relatively short time span, or any suitable transitory storage before moving data to persistent storage.

In particular embodiments, the Store Layer 420 handles requests from and responses to API layer 450 to store and retrieve data from Persistence Layer 410. The Store Layer 420 may handle building and updating database schemas by example, registering entity types and metrics types. As an example and not by way of limitation, Store Layer 420 may register a VM-type entity having an IP Address, Number of Virtual CPUs and OS Type attributes. Store Layer 420 may also handle creation, update and deletion of entities and attributes. As an example and not by way of limitation, Store Layer 420 may create a VM-type and populate the attributes described above. Furthermore, Store Layer 420 may update metrics associated with entities.

In particular embodiments, the entity database may provide a "Watch" library for client applications to monitor identified entities in the virtualization environment. Alerts may be generated for any relevant event (e.g., when an entity is created, deleted, or updated). Some embodiments may provide information regarding any delta between the entity's last-known status and the entity's current status. In particular embodiments, the entity database may provide the ability to configure watches using expressions, where the expression identifies one or more entities in relation to the current status of the entity relationship graph. In particular embodiments, the entity database may provide the ability to terminate such watches upon satisfaction of a specified condition. In particular embodiments, the entity database may provide the ability to provide compressed information about multiple events. In particular embodiments, entity updates and stats updates are treated differently by the database. As an example and not by way of limitation, entity updates may be atomic and write-through, so that a read operations will obtain the most recent values associated with entities. However, metrics and statistics may be lazily updated in order to improve database performance. Thus, a read operation on metrics may not yield the most recent data.

In particular embodiments, the database stores current entity state information as well as an entity trail for some or all entities. In particular embodiments, an entity trail may include some or all prior values for the entity, along with corresponding timestamps for each value. As an example and not by way of limitation, a Host entity may have one child VM entity at a time 1000, and then receive an update to initiate a second VM entity at time 1002, and then a third VM entity at time 1006. The database may store the first VM entity with associated timestamps 1000-1002 and the second VM entity with associated timestamps 1002-1006 in the entity trail. In this manner, the database may be able to track every entity's transition over time. Although this example manner of storing timestamps is described for ease of explanation, other suitable manners of storing timestamps may be used.

In particular embodiments, the database may provide mechanisms to query and retrieve a current state of an entity, as well as the state of the entity at a specific point in the past, or the states within a time range. In particular embodiments, the database may provide mechanisms to query and retrieve past metrics. In particular embodiments, the database also provide future metrics through extrapolation or any suitable method of predicting future metrics. As an example and not by way of limitation, assuming a present time of 1000, a user may query the database for the CPU utilization of a Host-type entity from times 900-1100. The database may return a set of values and associated timestamps where values for timestamps 900-1000 correspond to observed values and values from 1000-1100 correspond to an extrapolation based on the slope of the observed curve. Metrics may be stored as raw values, or may be stored in buckets by using downsampling.

In particular embodiments, the database may provide a query language interface (e.g., SQL) to retrieve current and historical entity, attributes, and metrics data. As an example and not by way of limitation, the query language interface may support the following types of queries:

Point queries: retrieves an attribute value for a time range (e.g., fetch num_iops from VM1 for t1 to t2).

Filter queries: retrieves entities or attributes based on filtering using expressions on entity attributes and statistics (e.g., fetch num_iops for VMs with cpu_usage>50).

Grouping queries: retrieves entities or attributes grouped by entity attributes and statistics (e.g., fetch num_iops for all VMs grouped by cluster).

Sorting queries: retrieves entities or attributes sorted by parameters

Derived metrics: retrieves metrics based on expressions and rollup.

In particular embodiments, a management module may implement a monitoring policy for monitoring the operating status of one or more components of the virtualization environment. The management module may be a software implemented program consisting of instructions directed to implementing one or more rules. The management module may run (e.g., operate) on a leader node in a particular cluster or may run on a third-party server external to a cluster of host machines. Components that are monitored may include any suitable component of a virtualization environment, including but not limited to one or more hypervisors, one or more user VMs, one or more connection managers, I/O controllers, Controller/Service VMs (CVMs), storage resources, fans, processors, or any other virtualization or physical components. The monitoring policy may comprise one or more rules related to the operating status of one or more components. The rules may be related to latency, CPU usage, memory usage, data resiliency, data disk space, or any other suitable operating status of the components of the virtualization environment. Although this disclosure describes implementing a monitoring policy in a particular manner, this disclosure contemplates implementing a monitoring policy in any suitable manner.

Particular embodiments may provide a graphical user interface ("GUI") and a framework for enabling alert configuration for entities and/or resources in the virtualization environment. Particular embodiments may also provide mechanism to modify the alert configuration on a per-cluster basis to suit the requirements of a cluster. The framework may comprise a central module for storing and managing information about alerts, as well as handling alerts, and a number of element modules on the nodes for implementing alerts, handling alerts, and sending status information back to the central module. The framework may determine when and whether to generate an alert, what severity level has been triggered, and what should be done once an alert has been generated. Information triggering alerts may come from any number of sources or services in the virtualization environment. The management module and/or the element modules may assess the information (e.g., the fan speed is high, which means that it may be getting too hot; or the disk usage is getting high, which means that one or more nodes may be approaching the capacity limit), then determine what action to take. In particular embodiments, the framework may provide default values for alert rules, as well as the ability to establish exceptions to the default values. In particular embodiments, the GUI may group together similar exceptions, and such exceptions may be configured on a per-cluster, per-entity, or per-resource basis. Specific clusters, elements, and/or resources may be associated with existing or new exceptions from a centralized location, on a per-alert basis. Particular embodiments may facilitate exploring various time series metrics which can help in analyzing an alert. Particular embodiments may gather all relevant metrics and present the information in a single GUI.

Particular embodiments may provide a rule-based mechanism (e.g., monitoring policy) to send out notifications (e.g., by email) when an alert is triggered. Particular embodiments may provide a subscription mechanism to enable end-users (e.g., systems administrators) to subscribe to different categories or types of alerts. The recipients of these notifications (e.g., a global recipient list) may be specified via a GUI and/or by command-line entry or a script. Particular embodiments provide a notification rule mechanism to subscribe to alert notifications based on the severity, category and originating cluster (in case of the central module). Multiple rules may be specified. In particular embodiments, the management module may receive data associated with the operating status of one or more components of the virtualization environment. As an example and not by way of limitation, the management module may receive data about the available disk space on a particular component, or whether or not a CVM successfully connected to another component in the virtualization environment. In particular embodiments, the management module may compare the received data to one or more rules comprised in the monitoring policy. As an example and not by way of limitation, a rule in the monitoring policy may state that the available disk space should not fall below 10 MB. If the received data indicates that there is less than 10 MB of disk space available, the management module may raise (e.g., initiate) an alert. Although this disclosure describes providing a rule based mechanism to send notifications in a particular manner, this disclosure contemplates providing a rule based mechanism to send notifications in any suitable manner.

In particular embodiments, the alert may be associated with a notification that is sent in conjunction with the alert to one or more recipients. In particular embodiments, the recipients may be divided into one or more subsets, wherein each subset corresponds to one or more of the rules. When an alert is raised, the notification is sent to recipients of all rules that match the severity, category and cluster criteria. If none of the rules match, the notification is sent by default to the global recipient list. In particular embodiments, the end-user may be able to modify the order in which the notification subscription rules are applied. In addition, end-users may be able to terminate further rule processing if any rule matches with an alert. In particular embodiments, the notification may specify which of the one or more rules that have been satisfied. As an example and not by way of limitation, if a CVM failed to connect, a notification may be sent to recipients that states that a CVM failed to connect, and may also specify which CVM failed along with any other relevant information. In particular embodiments, the notification may specify a severity of the alert (e.g., warning, critical), a category of the alert (e.g., is the alert related to hardware? software? does it apply across several clusters of host machines? is it related to performance?), or an origin of the alert. The origin of the alert may be a particular cluster, a particular host machine, or a particular component on a host machine (e.g., the hypervisor on host machine X). Although this disclosure describes sending notifications in accordance with a monitoring policy in a particular manner, this disclosure contemplates sending notifications in accordance with a monitoring policy in any suitable manner.

Figure 5:
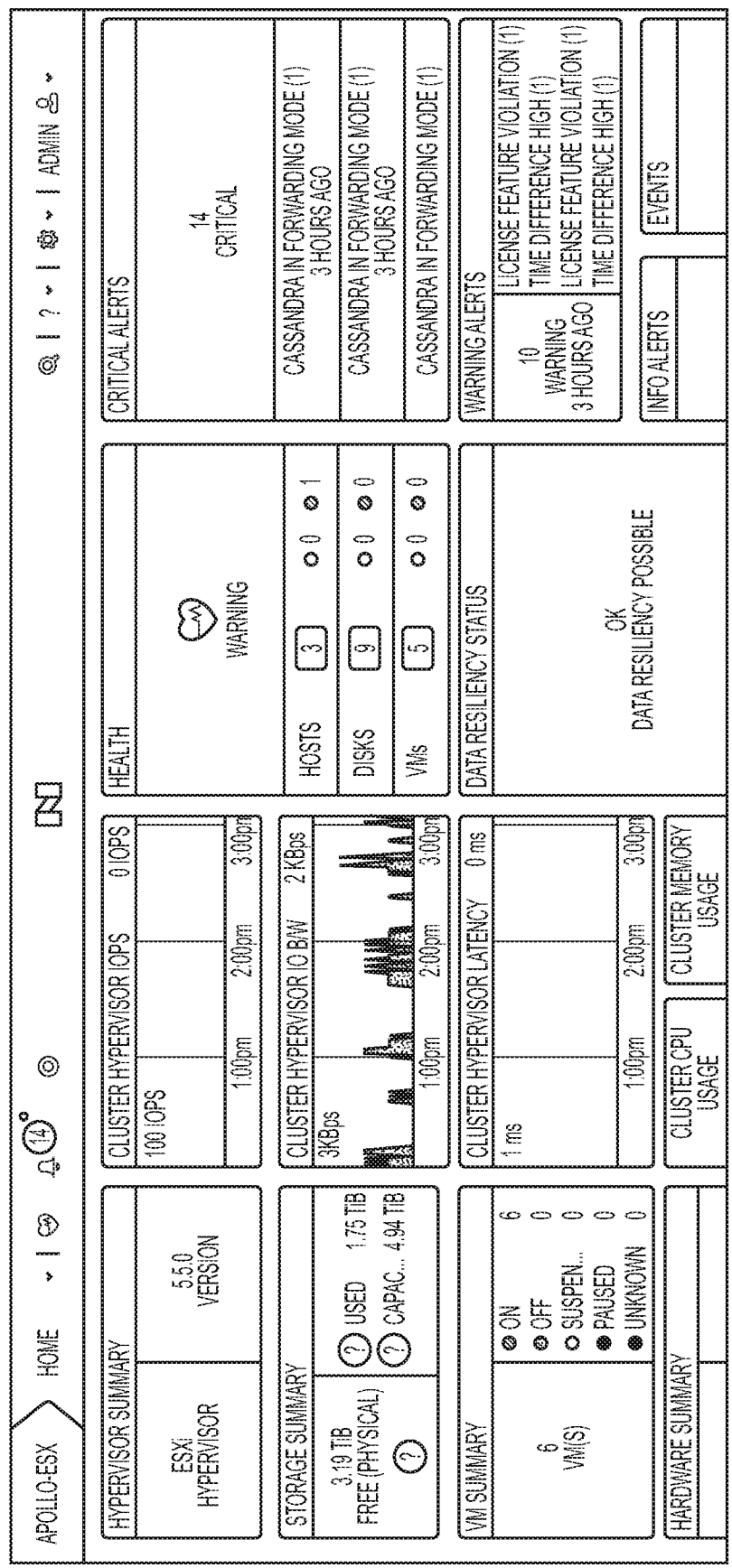
FIG. 5 illustrates a GUI providing status information of a particular cluster for entities and/or resources in the virtualization environment.

FIG. 5 illustrates a GUI providing status information for entities and/or resources (e.g., components) in the virtualization environment. In particular embodiments, the GUI may display one or more summaries of one or more components operating in the virtualization environment. The summaries may include a storage summary, a VM summary, a hardware summary, or any other suitable summary. The GUI may further indicate a version of any applicable components. As an example and not by way of limitation, the GUI may indicate that hypervisor ESXi is currently on version 5.5.0. The GUI may further display a history of past operation of one or more components, such as latency levels, historical storage usage, or any other suitable data metric. The GUI may further indicate the number of alerts that have risen to the "critical" level of severity and how many have risen to the "warning" level of severity. Although this disclosure describes providing a GUI for status information of components in a virtualization environment in a particular manner, this disclosure contemplates providing a GUI for status information of components in a virtualization environment in any suitable manner.

Figure 6:
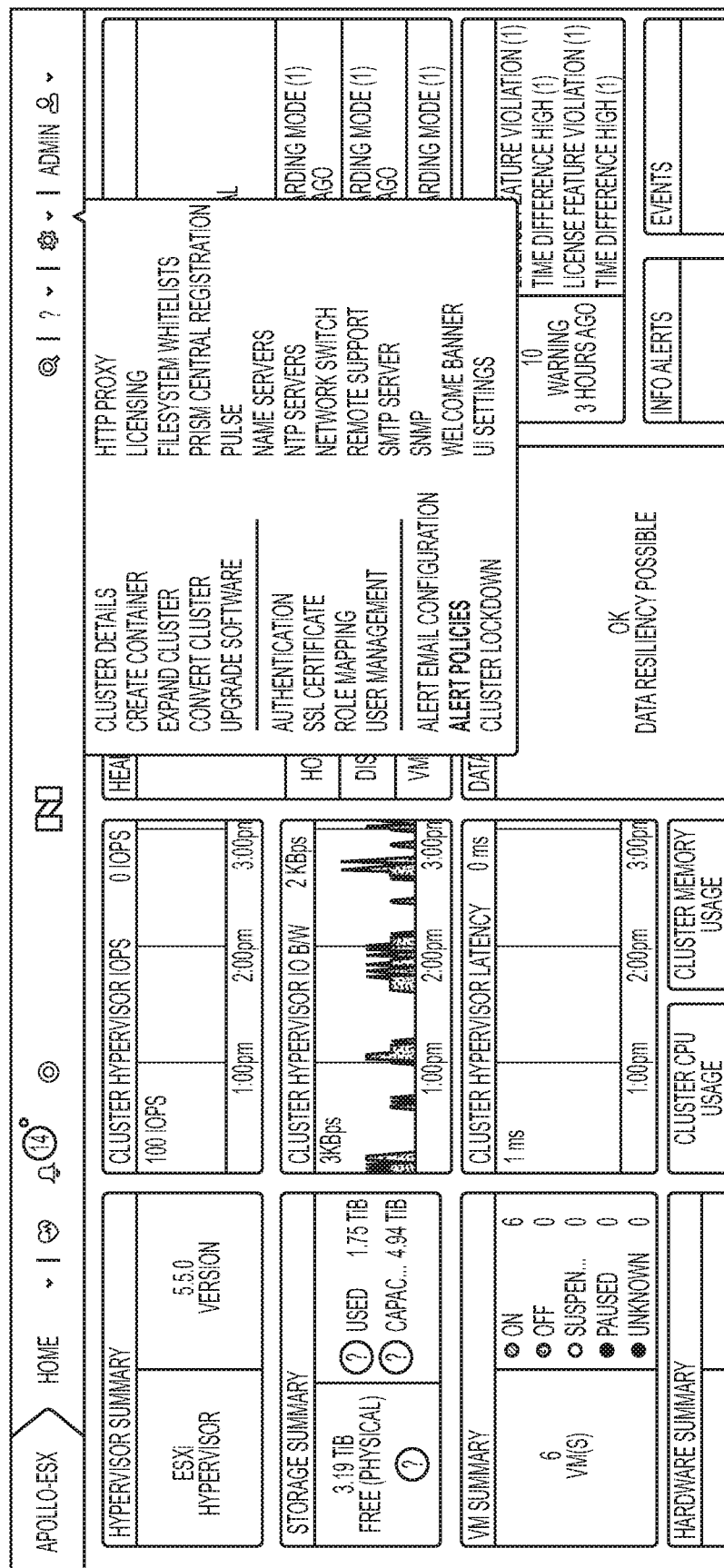
FIG. 6 illustrates a menu including alert rule configuration options, including Alert Policies of a particular cluster.

FIG. 6 illustrates a menu including alert rule configuration options, including Alert Policies. The menu may be reachable from a settings icon on the GUI. The menu may include various selectable options, such as cluster details (in which a user may access information about the particular cluster or clusters associated with the GUI), create container (in which the user may create a new object corresponding to a new container-type node 342), options to expand or convert a cluster, to upgrade software, or to view or configure any suitable menu items. Although this disclosure describes providing a GUI for a menu in a particular manner, this disclosure contemplates providing a GUI for a menu in any suitable manner.

Figure 7:
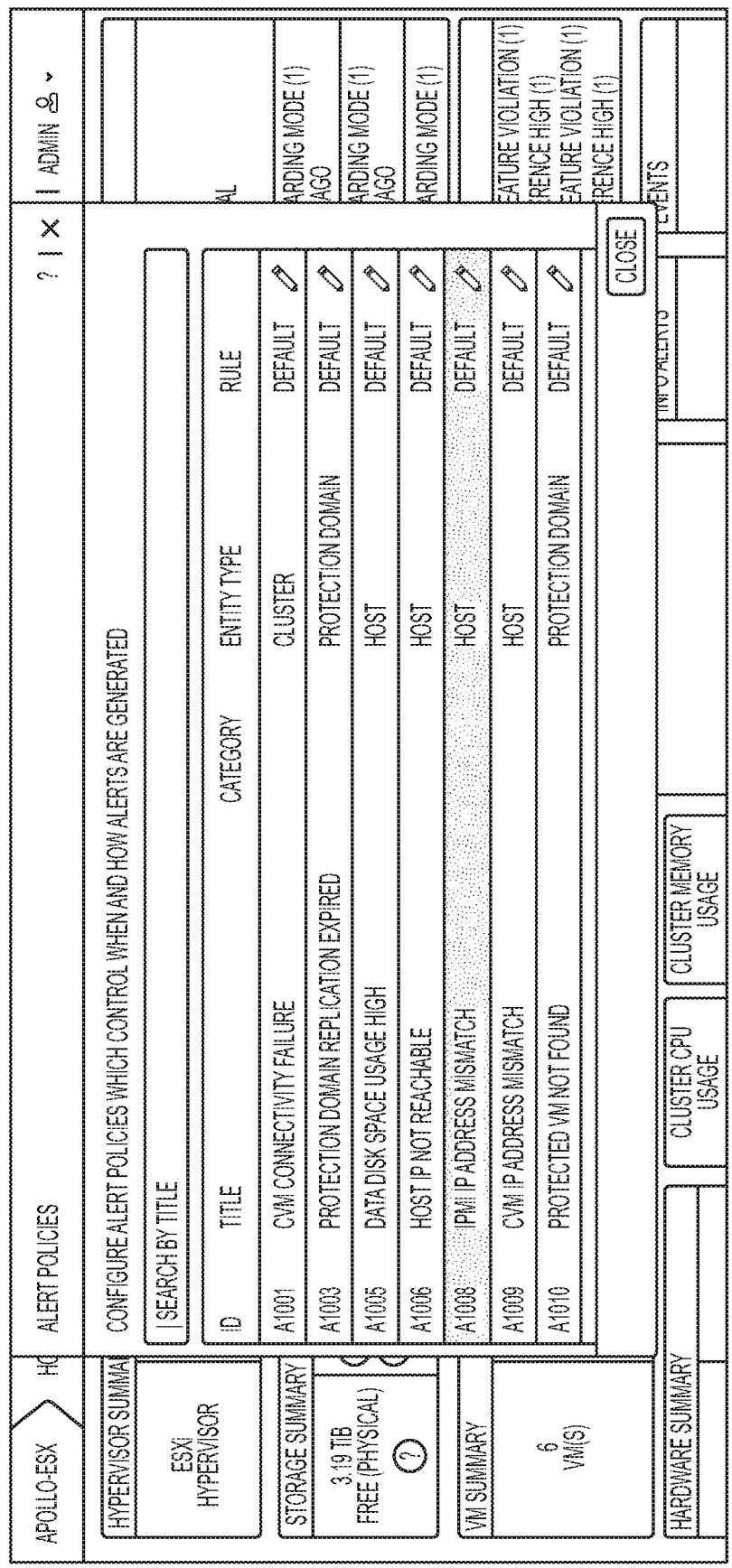
FIG. 7 illustrates a GUI to search for/browse through existing alert policies of a particular cluster.

FIG. 7 illustrates a GUI to search for/browse through existing alert policies. The GUI may have a text input field, where a user may type any n-grams to search for an existing alert policy. As an example and not by way of limitation, a user may enter the following into the text input field: "CVM connectivity," the management module via the GUI may return an alert policy that says "CVM connectivity failure." The user may have the option to select that alert policy to adjust its settings or otherwise interact with it. The GUI may also provide a list of selectable alert policies that the user may view and interact with. Such a list of alert policies may appear below or proximate to the text input field. Although this disclosure describes providing a GUI for status information of components in a virtualization environment in a particular manner, this disclosure contemplates providing a GUI for status information of components in a virtualization environment in any suitable manner.

FIG. 8 illustrates values for a particular configuration policy, wherein the values are set to "Default" settings. The configuration policy may include an option for adjusting the threshold of the severity indication of the alert. A user may configure when an alert is merely a warning and when the alert rises to the level of critical. If the rule is measurable (e.g., CPU usage is measurable), the user may be able to set thresholds for when the operating status necessitates a warning alert or a critical alert. As an example and not by way of limitation, a user may configure the threshold details for CPU usage. The user may set a warning alert to be initiated when the CPU usage is 75% of maximum, and a critical alert to be initiated when the CPU usage is 90% of maximum. Although this disclosure describes configuring thresholds in a particular manner, this disclosure contemplates configuring thresholds in any suitable manner.

Figure 9:
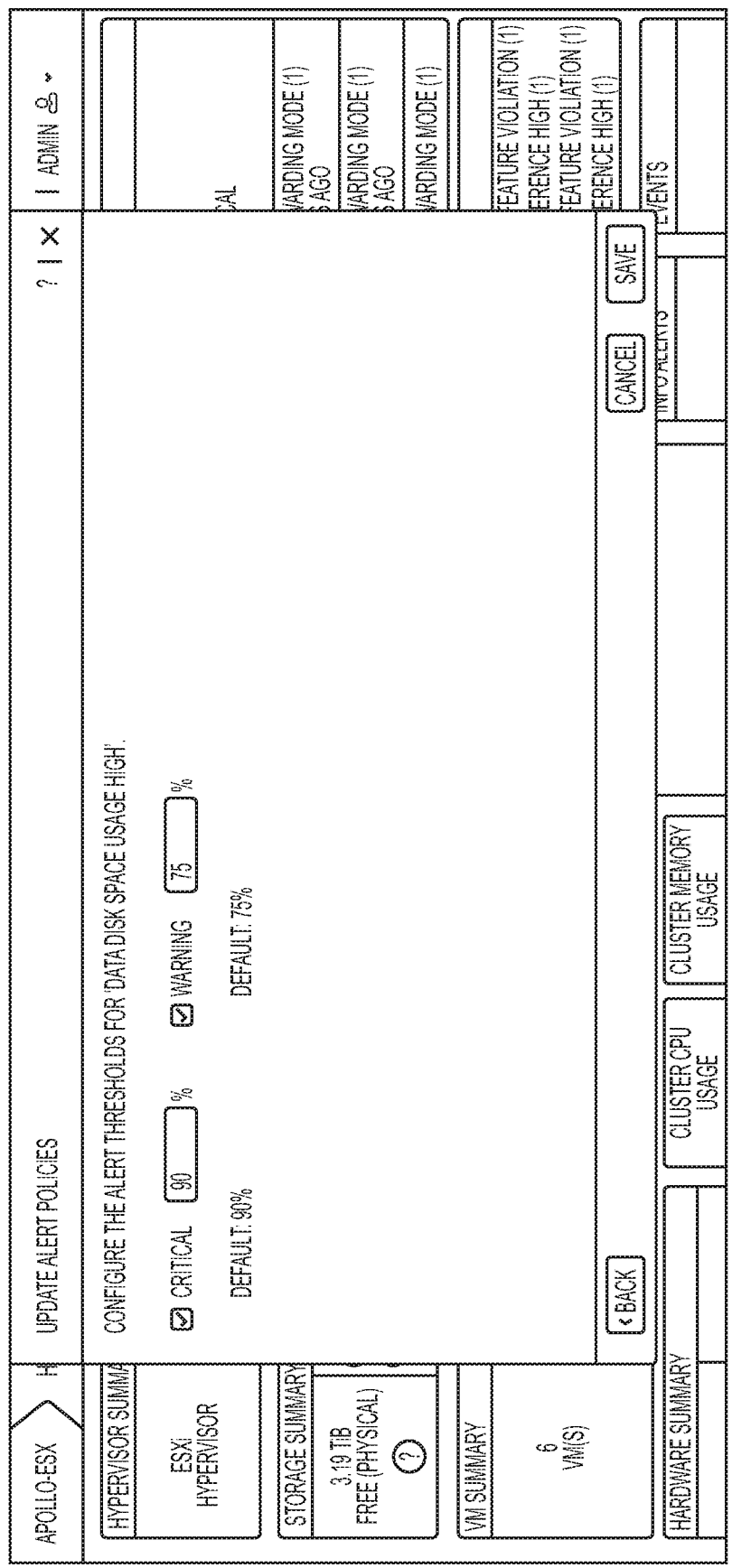
FIG. 9 illustrates an interface to configure values for an alert policy of a particular cluster.

FIG. 9 illustrates an interface to configure values for a particular configuration policy. The user may be able to check or uncheck particular alerts, and thus may be able to specify which alerts should be raised. As an example and not by way of limitation, a user may configure the alert thresholds for "Data Disk Space Usage High." The user may check or uncheck a box associated with a critical alert, as well as a warning alert. If the user unchecks the box associated with the warning alert, no alert will be initiated if the data disk space usage surpasses 75% but does not reach 90%. Only a critical alert will be raised if the data disk space usage surpasses 90%. Although this disclosure describes configuring thresholds in a particular manner, this disclosure contemplates configuring thresholds in any suitable manner.

Figure 10:
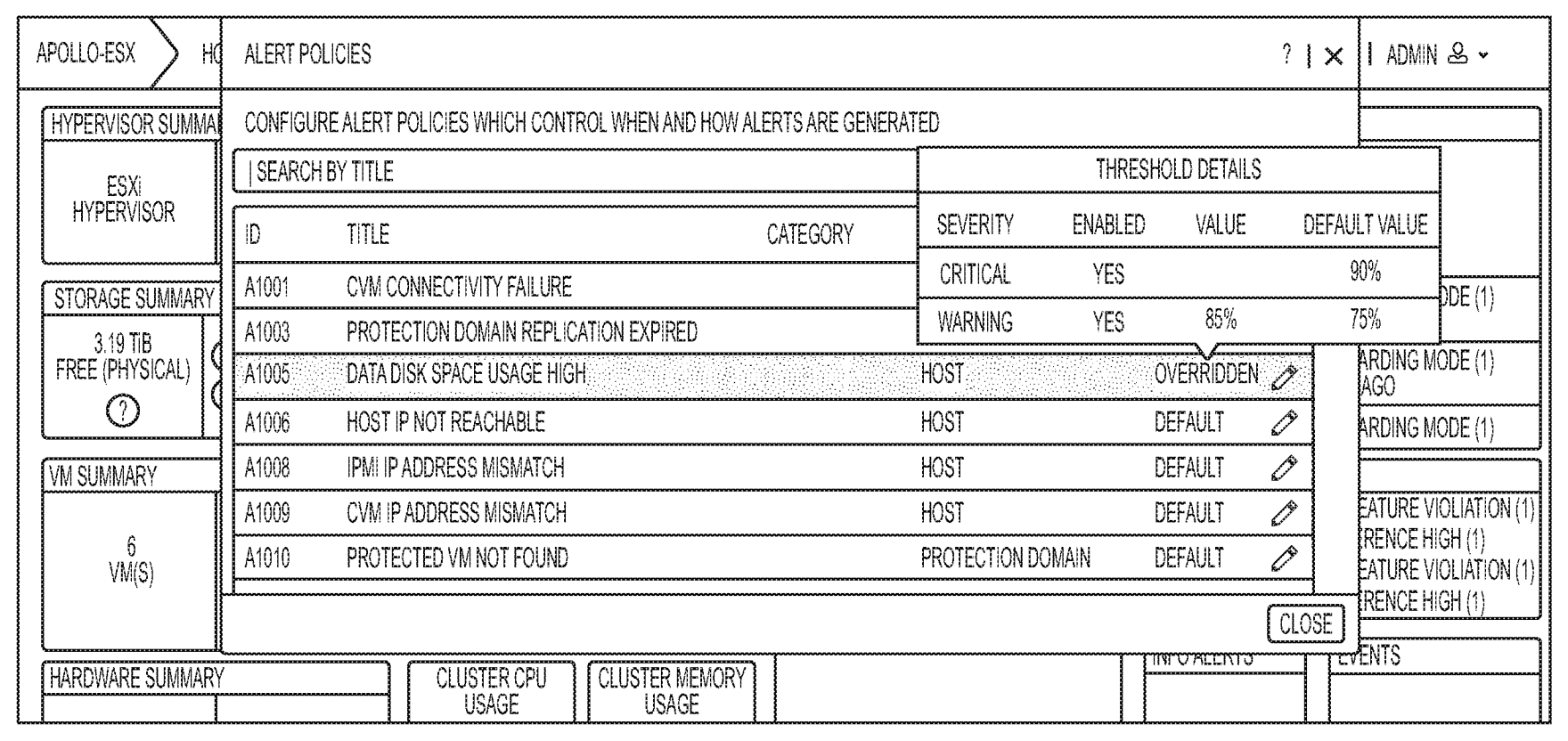

FIG. 10 illustrates values for a particular configuration policy, wherein the default values have been "Overridden" and are now set to the user-configured values. The user may override the default values given in FIG. 8 by specifying different values for various alerts and alert severities. As an example and not by way of limitation, the user may change the threshold of the warning alert from 75% to 85% by typing or otherwise entering 85% into the appropriate column in the GUI. If the user does this, a warning alert may be initiated when the particular operating status reaches 85% of maximum, but not at 75%. Although this disclosure describes configuring thresholds in a particular manner, this disclosure contemplates configuring thresholds in any suitable manner.

Figure 11:
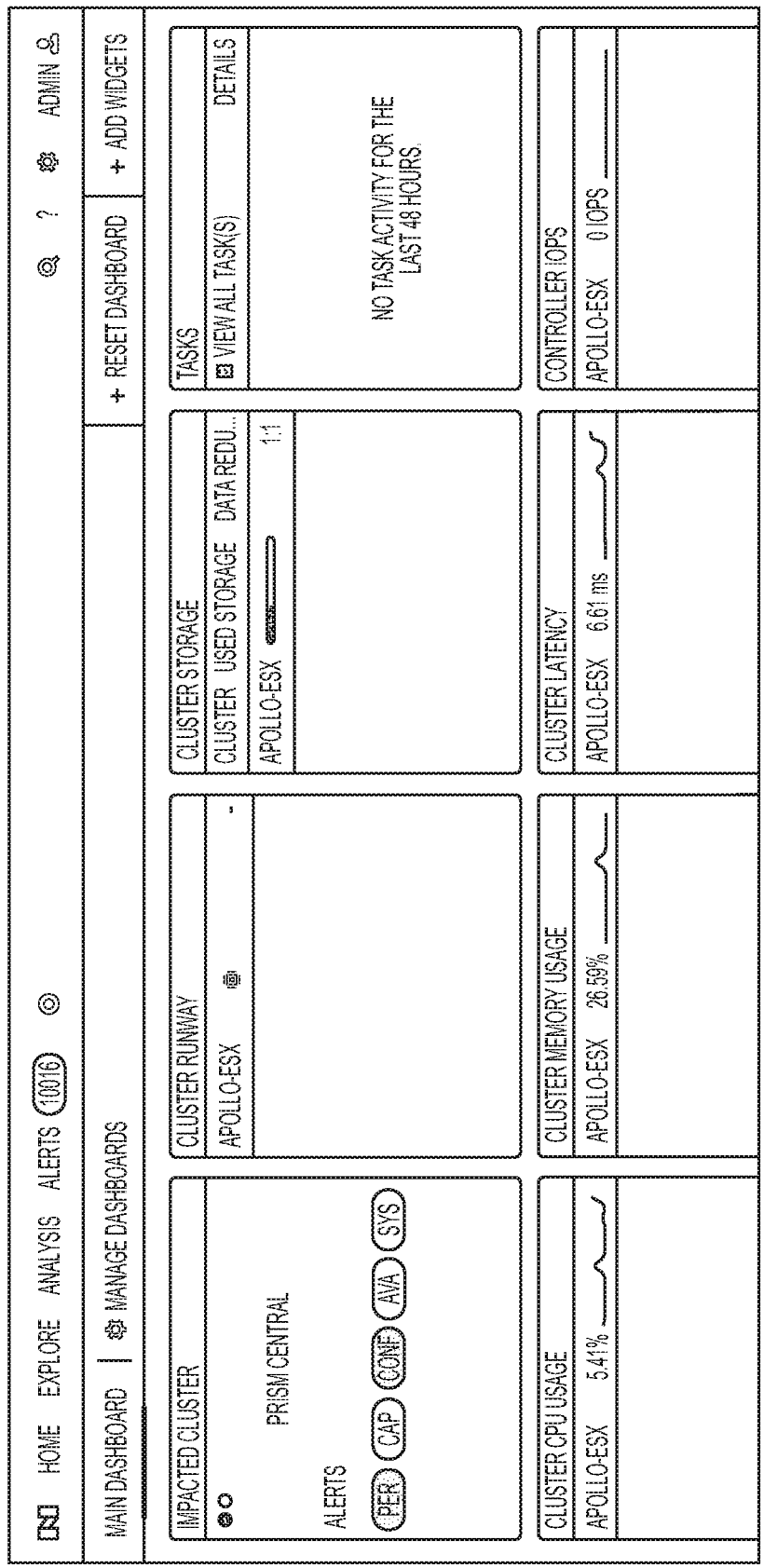
FIG. 11 illustrates a dashboard GUI illustrating cluster status information in the central module.

FIG. 11 illustrates a dashboard GUI illustrating cluster status information in the central module. The GUI may display data associated with an operating status for various components in the particular cluster or group of clusters, such as cluster CPU usage, cluster memory usage, cluster latency, controller IOPS, or any other suitable component. Although this disclosure describes displaying a dashboard GUI in a particular manner, this disclosure contemplates displaying a dashboard GUI in any suitable manner.

FIG. 12 illustrates a GUI to search for/browse through existing alert policies in the central module. The GUI may have a text input field, where a user may type any n-grams to search for an existing alert policy. As an example and not by way of limitation, a user may enter the following into the text input field: "CVM connectivity," the management module via the GUI may return an alert policy that says "CVM connectivity failure." The user may have the option to select that alert policy to adjust its settings or otherwise interact with it. The GUI may also provide a list of selectable alert policies that the user may view and interact with. Such a list of alert policies may appear below or proximate to the text input field. Although this disclosure describes providing a GUI for status information of components in a virtualization environment in a particular manner, this disclosure contemplates providing a GUI for status information of components in a virtualization environment in any suitable manner. The GUI may further comprise selectable options to configure exceptions to one or more global rules. If an exception to a global rule exists, the GUI may so indicate the count of exceptions with an integer (e.g., "1", as shown in FIG. 12) next to the rule. If no exception exists, the GUI may so indicate with a "0" next to the rule. Although this disclosure describes configuring exceptions in a particular manner, this disclosure contemplates configuring exceptions in any suitable manner.

Figure 13:
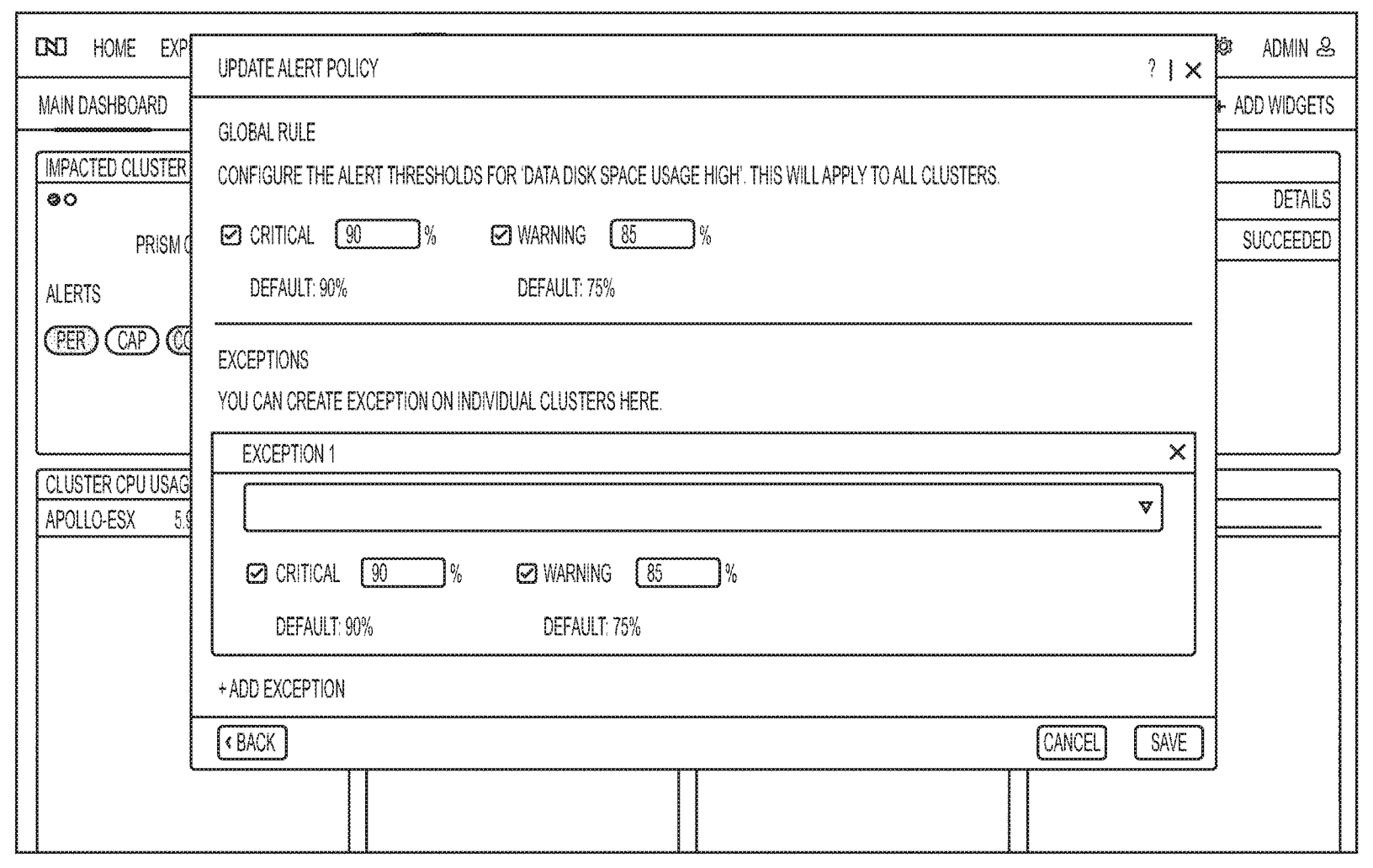

FIG. 13 illustrates a GUI to update an alert policy for a global rule. When a user selects to edit or update an alert policy for a global rule, the user may select the edit icon and may be presented with the GUI in FIG. 13. The user may then be able to configure the alert thresholds for the particular rule, toggle the critical and warning alerts on and off, create exceptions to the rule for individual clusters or for groups of clusters, and perform any other suitable task. Although this disclosure describes configuring an alert policy in a particular manner, this disclosure contemplates configuring an alert policy in any suitable manner.

Figure 14:
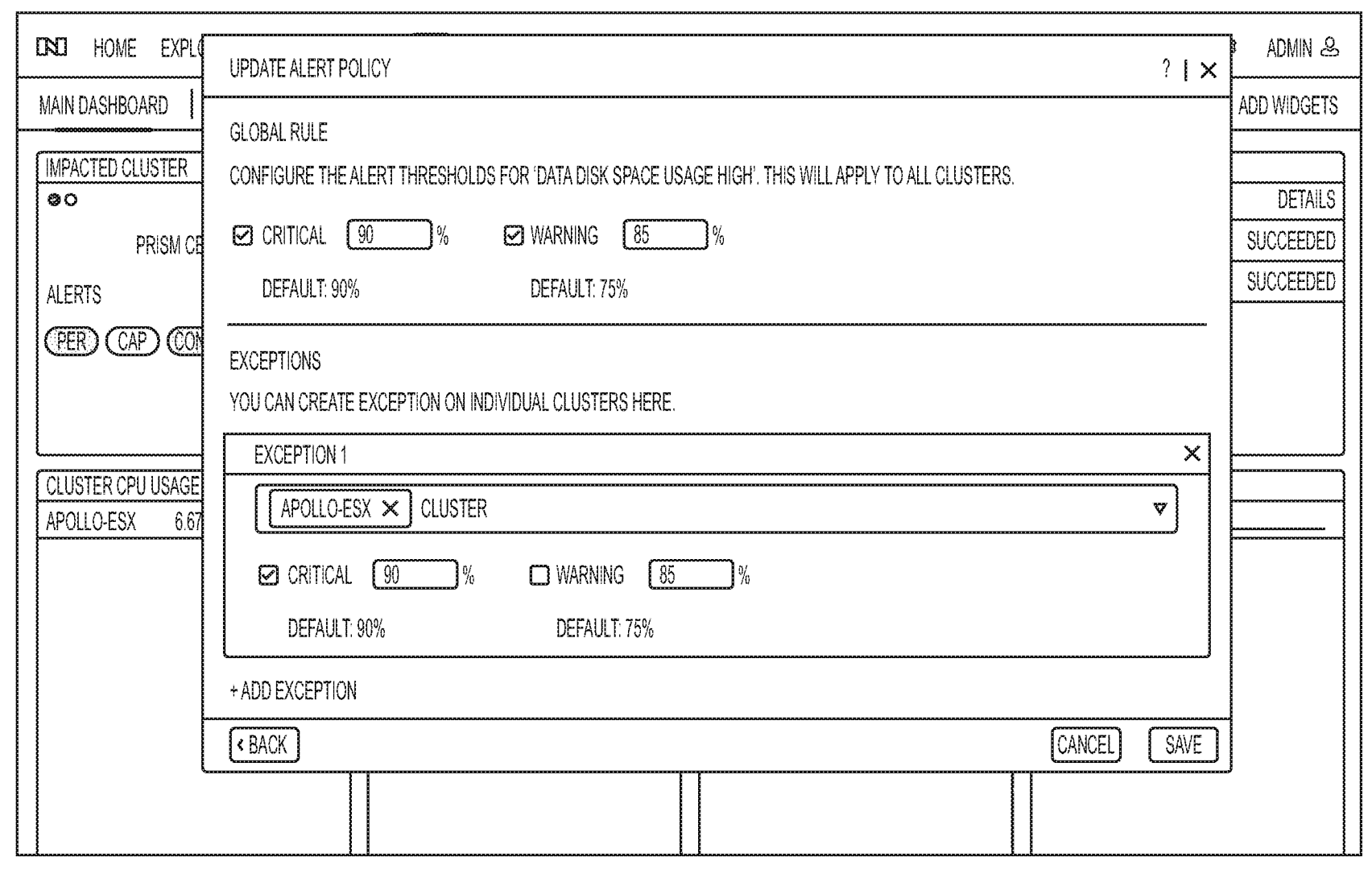

FIG. 14 illustrates the GUI of FIG. 13, updated to add a cluster-based exception where only critical-level alerts are provided (and not warning-level alerts). When a user selects to edit or update an alert policy for a global rule, the user may select the edit icon and may be presented with the GUI in FIG. 14. The user may then be able to configure the alert thresholds for the particular rule, toggle the critical and warning alerts on and off, create exceptions to the rule for individual clusters or for groups of clusters, and perform any other suitable task. Although this disclosure describes configuring an alert policy in a particular manner, this disclosure contemplates configuring an alert policy in any suitable manner.

Figure 15:
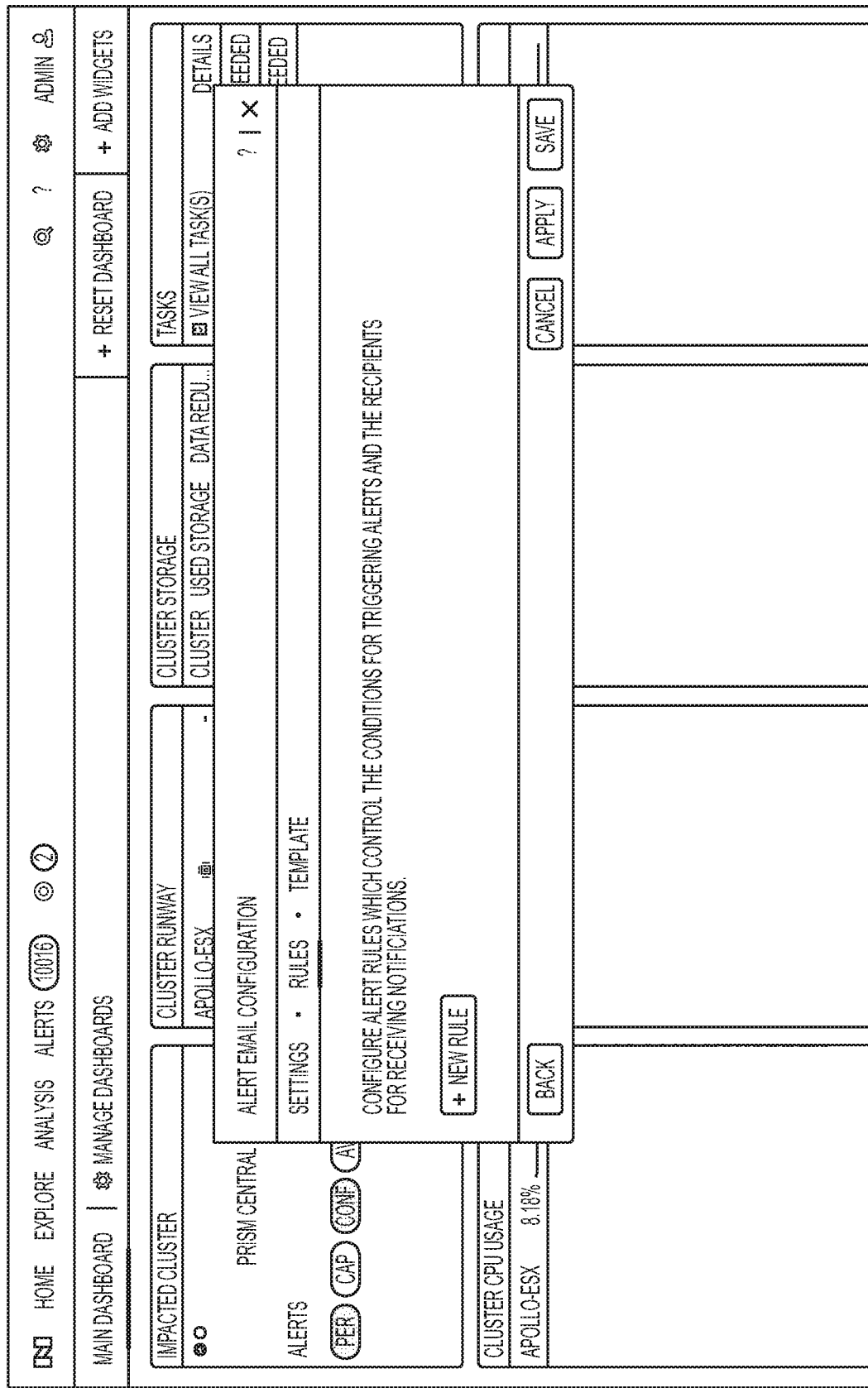
FIG. 15 illustrates a GUI to create a new notification subscription rule in the central module.

FIG. 15 illustrates a GUI to create a new notification subscription rule. The user may be able to configure alert rules which control the conditions for triggering alerts and the recipients for receiving notifications using this particular GUI. The user may create a new rule, configure an existing rule, and specify who may receive notifications in association with any alerts triggered by the particular rule. Although this disclosure describes configuring an alert policy in a particular manner, this disclosure contemplates configuring an alert policy in any suitable manner.

Figure 16:
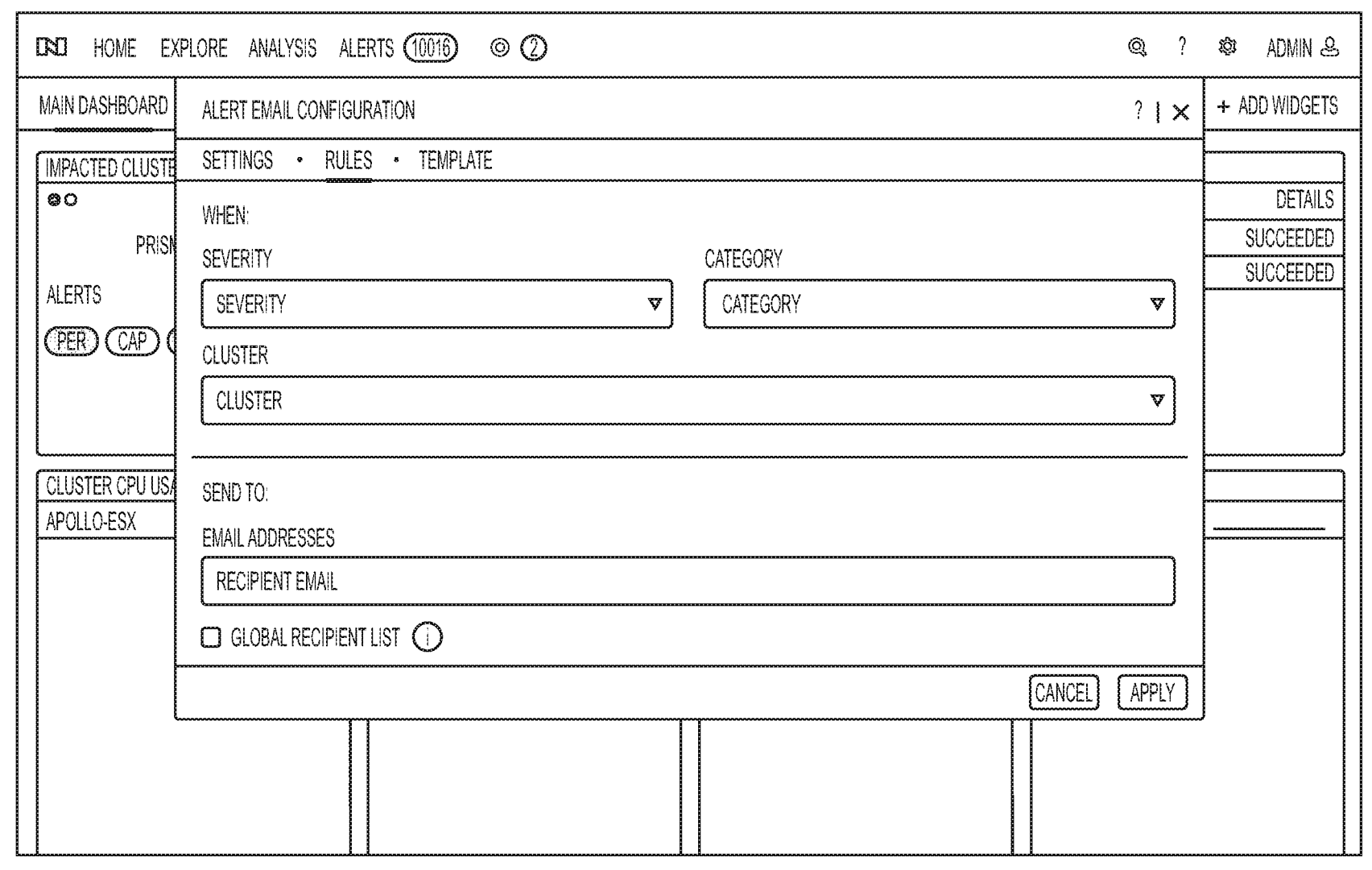

FIG. 16 illustrates a GUI to configure the new notification subscription rule. Using this GUI, a user may specify when a notification should be sent in association with an alert for a particular rule. As an example and not by way of limitation, the user may specify that a notification be sent to recipients only when the alert rises to a critical level. The user may input one or more email addresses or may select a global recipient list or a subset of the global recipient list. The user may also specify the category of the rule. Although this disclosure describes configuring an alert policy in a particular manner, this disclosure contemplates configuring an alert policy in any suitable manner.

FIG. 17 illustrates selection of a severity level for the new notification subscription rule. Using this GUI, a user may specify when a notification should be sent in association with an alert for a particular rule based on the severity level of the alert. As an example and not by way of limitation, the user may specify that a notification be sent to recipients only when the alert rises to a critical level. Although this disclosure describes configuring an alert policy in a particular manner, this disclosure contemplates configuring an alert policy in any suitable manner.

Figure 18:
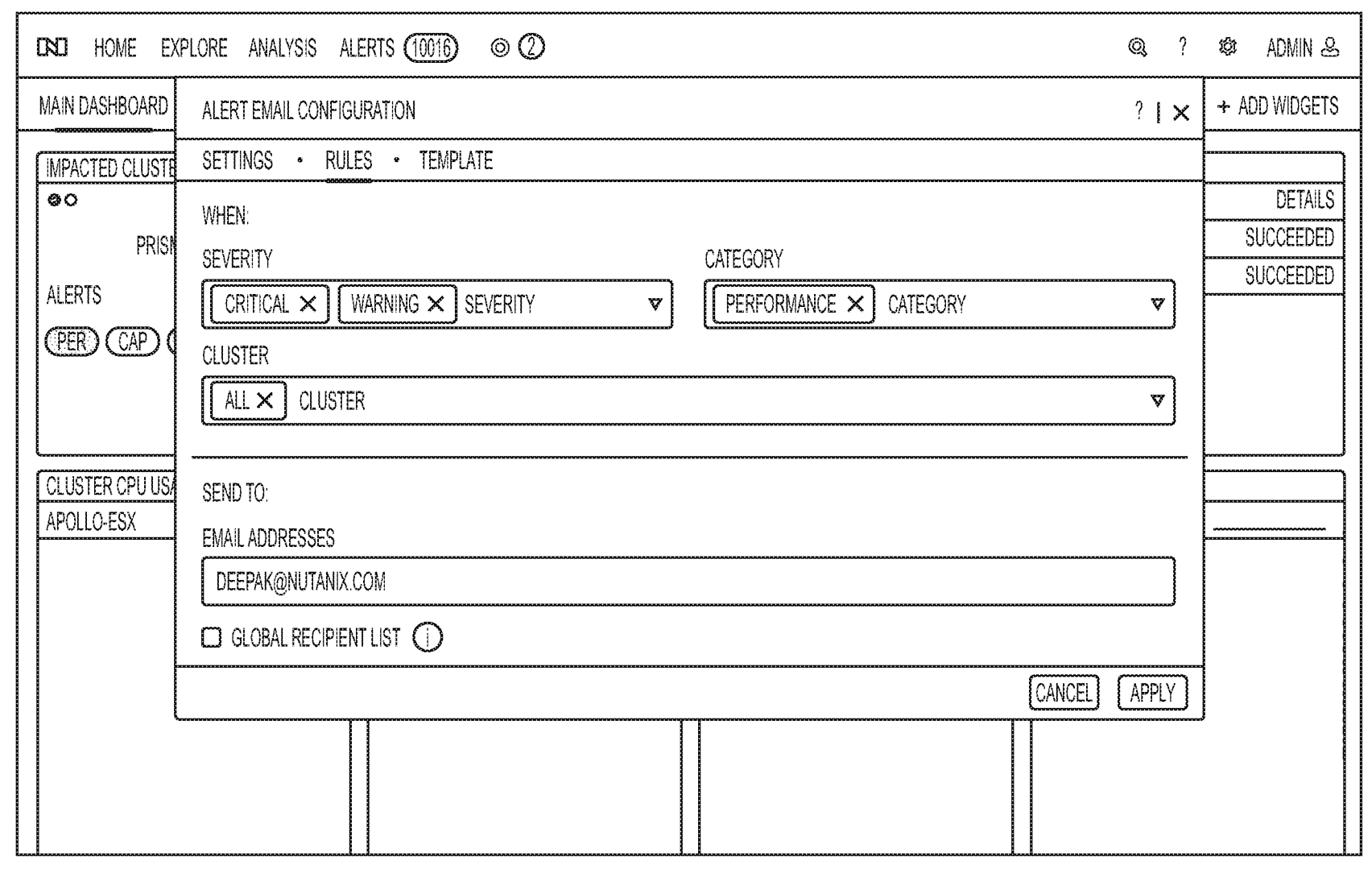

FIG. 18 illustrates a display with several values configured for the new notification subscription rule. In this example, the user has selected that a notification associated with the alert for a particular rule should be sent whenever the severity level is warning or critical, that it applies to all clusters, and that it applies to the category "performance." The user has also input a recipient to receive the notifications: DEEPAK@NUTANIX.COM. Although this disclosure describes configuring notifications for an alert policy in a particular manner, this disclosure contemplates configuring notifications for an alert policy in any suitable manner.

Figure 19:
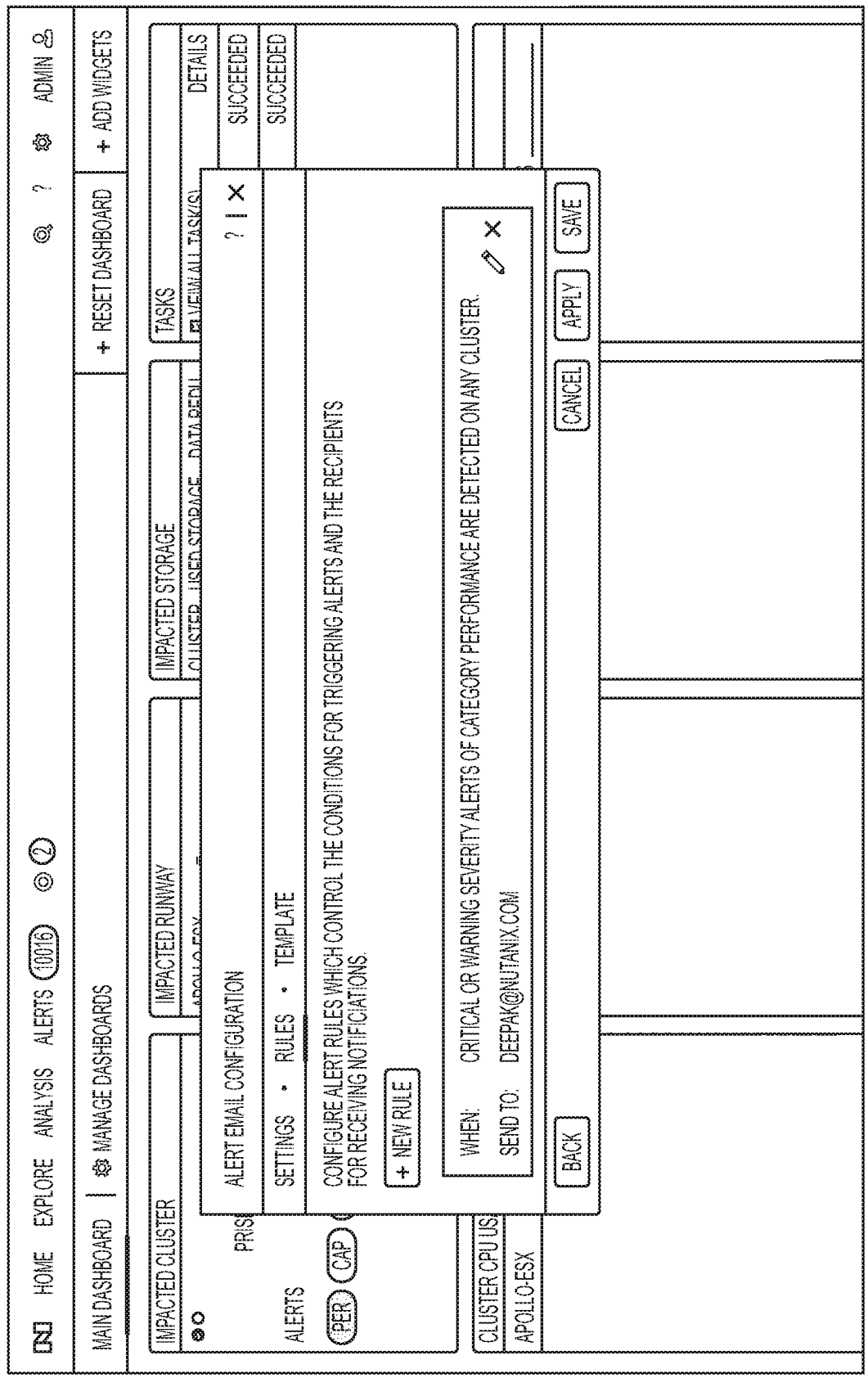
FIG. 19 illustrates a GUI listing one email notification for a rule in the central module.

FIG. 19 illustrates a GUI to configure email notification for a rule. In this example, the user has selected that a notification associated with the alert for a particular rule should be sent whenever the severity level is warning or critical, that it applies to all clusters, and that it applies to the category "performance." The user has also input a recipient to receive the notifications: DEEPAK@NUTANIX.COM. Although this disclosure describes configuring notifications for an alert policy in a particular manner, this disclosure contemplates configuring notifications for an alert policy in any suitable manner.

Figure 20:
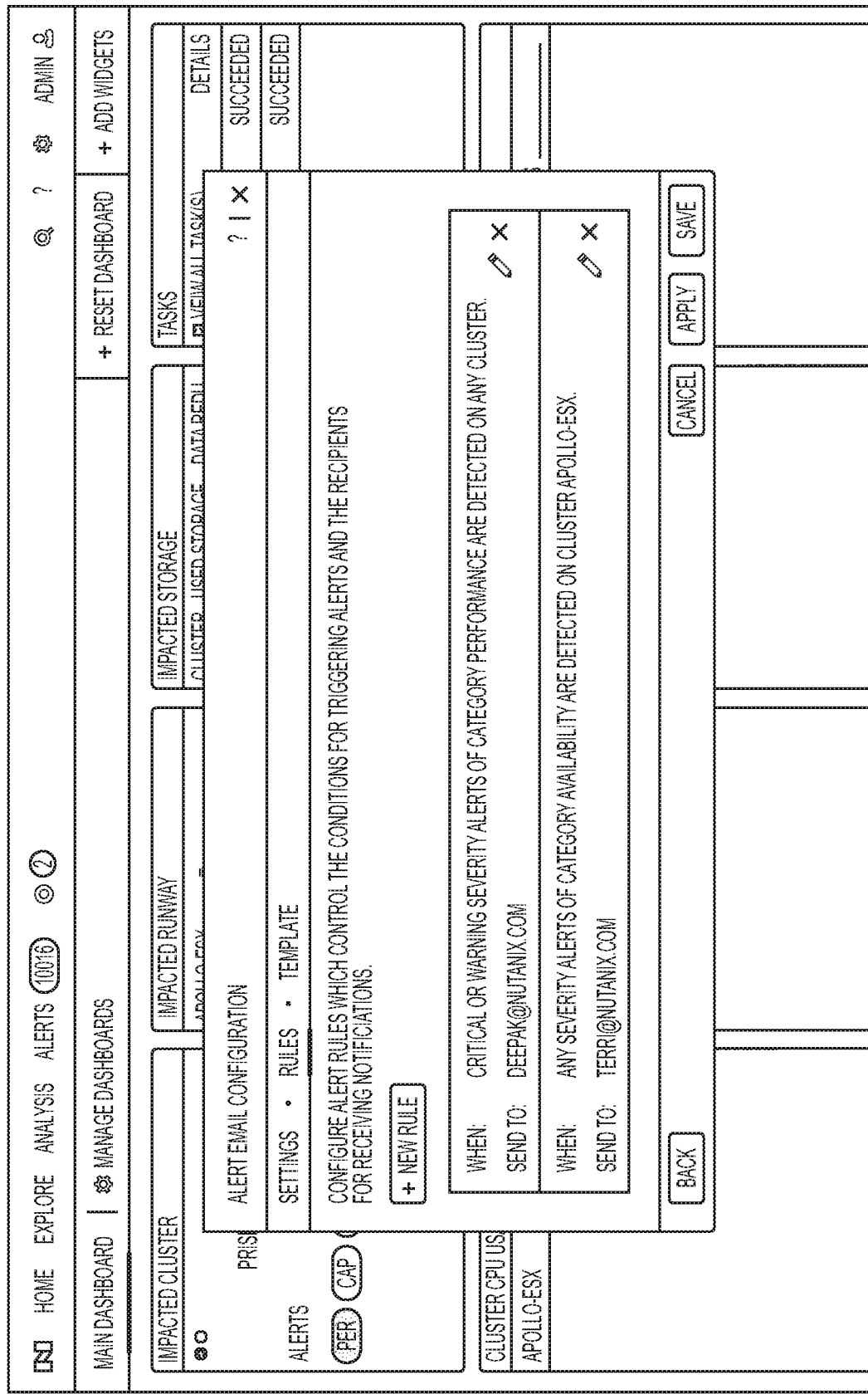
FIG. 20 illustrates a GUI listing several configured email notifications for different rules in the central module.

FIG. 20 illustrates a GUI listing several configured email notifications for different rules. In this example, the user has selected that a notification associated with the alert for a particular rule should be sent whenever the severity level is warning or critical, that it applies to any cluster, and that it applies to the category "performance." The user has set a second notification rule to send a notification for any severity alerts (e.g., all severity levels) for the category "availability" that are detected on the cluster apollo-esx. The user has also input a recipient to receive notifications for the first rule (DEEPAK@NUTANIX.COM) and a recipient to receive notifications for the second rule (TERRI@NUTANIX.COM). Although this disclosure describes configuring notifications for an alert policy in a particular manner, this disclosure contemplates configuring notifications for an alert policy in any suitable manner.

FIG. 21 illustrates a GUI listing several alerts, wherein the list of results was generated by sorting and filtering through the larger list. This list may comprise any number of alerts, depending on the filtering settings. This list may provide the user with a quick overview of all the alerts on a particular cluster or group of clusters. The user has sorted by create time (e.g., the time the alert was created or initiated), and has filtered to only show critical alerts that are unresolved. The list may display the name of the rule associated with the alert, the category of the rule (e.g., capacity, system indicator, configuration, performance, or availability), the time the alert was initiated, and any other suitable information. Although this disclosure describes displaying an alert list in a particular manner, this disclosure contemplates displaying an alert list in any suitable manner.

FIG. 22 illustrates a GUI displaying information about an alert and root cause analysis results for the alert. The root cause analysis may be computer generated or may be manually inputted. As an example and not by way of limitation, a user may input the root cause as "controller VM was intentionally rebooted," or this description may be generated automatically by the management module or other suitable system. The GUI may display a summary of the alert that includes various information such as the severity, the cluster name, the cluster version, the time the alert was initiated, the category, the status of the component associated with the alert, whether the alert has been resolved, and any other suitable information. Although this disclosure describes displaying a GUI for a root cause analysis in a particular manner, this disclosure contemplates displaying a GUI for a root cause analysis in any suitable manner.

Figure 23:
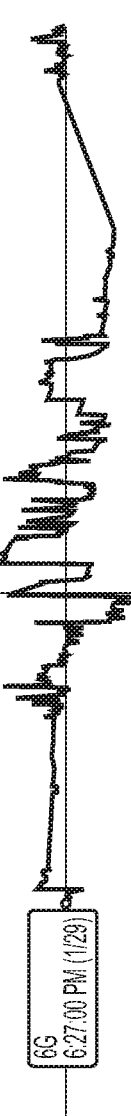
FIG. 23 illustrates a GUI displaying graphical chart information about the historical status of a resource possibly implicated as a root cause.

FIG. 23 illustrates a GUI displaying graphical chart information about the historical status of a resource possibly implicated as a root cause. In this example, the alert is titled Controller VM 10.4.45.56 rebooted. The root cause may be controller VM out of memory causing kernel panic. The GUI may display a summary of the alert that includes various information such as the severity, the cluster name, the cluster version, the time the alert was initiated, the category, the status of the component associated with the alert, whether the alert has been resolved, and any other suitable information. The GUI may further display a graphical chart displaying information about the historical status of a resource that may have been associated with the root cause. In this example the graphical chart may be associated with the hypervisor or the CVM. Although this disclosure describes displaying a GUI for a root cause analysis in a particular manner, this disclosure contemplates displaying a GUI for a root cause analysis in any suitable manner.

Figure 24:
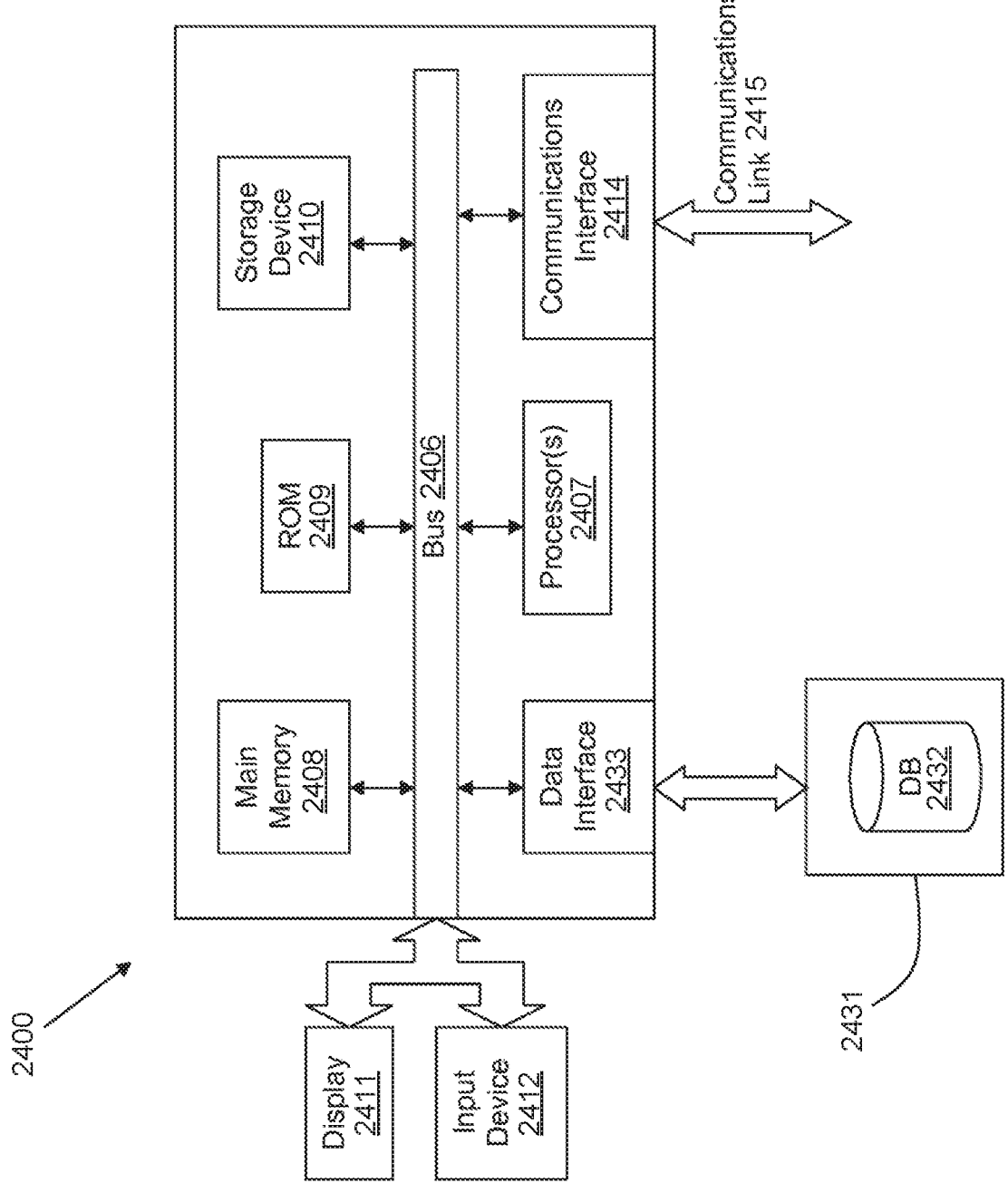
FIG. 24 illustrates a block diagram of a computing system suitable for implementing particular embodiments disclosed herein.

FIG. 24 is a block diagram of an illustrative computing system 2400 suitable for implementing particular embodiments. In particular embodiments, one or more computer systems 2400 perform one or more steps of one or more methods described or illustrated herein. In particular embodiments, one or more computer systems 2400 provide functionality described or illustrated herein. In particular embodiments, software running on one or more computer systems 2400 performs one or more steps of one or more methods described or illustrated herein or provides functionality described or illustrated herein. Particular embodiments include one or more portions of one or more computer systems 2400. Herein, reference to a computer system may encompass a computing device, and vice versa, where appropriate. Moreover, reference to a computer system may encompass one or more computer systems, where appropriate.

This disclosure contemplates any suitable number of computer systems 2400. This disclosure contemplates computer system 2400 taking any suitable physical form. As example and not by way of limitation, computer system 2400 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, computer system 2400 may include one or more computer systems 2400; be unitary or distributed; span multiple locations; span multiple machines; span multiple data centers; or reside in a cloud, which may include one or more cloud components in one or more networks. Where appropriate, one or more computer systems 2400 may perform without substantial spatial or temporal limitation one or more steps of one or more methods described or illustrated herein. As an example and not by way of limitation, one or more computer systems 2400 may perform in real time or in batch mode one or more steps of one or more methods described or illustrated herein. One or more computer systems 2400 may perform at different times or at different locations one or more steps of one or more methods described or illustrated herein, where appropriate.

Computer system 2400 includes a bus 2406 (e.g., an address bus and a data bus) or other communication mechanism for communicating information, which interconnects subsystems and devices, such as processor 2407, memory 2408 (e.g., RAM), static storage 2408 (e.g., ROM), dynamic storage 2410 (e.g., magnetic or optical), communication interface 2414 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 2412 (e.g., keyboard, keypad, mouse, microphone), and a display 2411. In particular embodiments, computer system 2400 may include one or more of any such components.

In particular embodiments, processor 2407 includes hardware for executing instructions, such as those making up a computer program. As an example and not by way of limitation, to execute instructions, processor 2407 may retrieve (or fetch) the instructions from an internal register, an internal cache, memory 2408, static storage 2408, or dynamic storage 2410; decode and execute them; and then write one or more results to an internal register, an internal cache, memory 2408, static storage 2408, or dynamic storage 2410. In particular embodiments, processor 2407 may include one or more internal caches for data, instructions, or addresses. This disclosure contemplates processor 2407 including any suitable number of any suitable internal caches, where appropriate. As an example and not by way of limitation, processor 2407 may include one or more instruction caches, one or more data caches, and one or more translation lookaside buffers (TLBs). Instructions in the instruction caches may be copies of instructions in memory 2408, static storage 2408, or dynamic storage 2410, and the instruction caches may speed up retrieval of those instructions by processor 2407. Data in the data caches may be copies of data in memory 2408, static storage 2408, or dynamic storage 2410 for instructions executing at processor 2407 to operate on; the results of previous instructions executed at processor 2407 for access by subsequent instructions executing at processor 2407 or for writing to memory 2408, static storage 2408, or dynamic storage 2410; or other suitable data. The data caches may speed up read or write operations by processor 2407. The TLBs may speed up virtual-address translation for processor 2407. In particular embodiments, processor 2407 may include one or more internal registers for data, instructions, or addresses. This disclosure contemplates processor 2407 including any suitable number of any suitable internal registers, where appropriate. Where appropriate, processor 2407 may include one or more arithmetic logic units (ALUs); be a multi-core processor; or include one or more processors 2406. Although this disclosure describes and illustrates a particular processor, this disclosure contemplates any suitable processor.

In particular embodiments, I/O interface 2412 includes hardware, software, or both, providing one or more interfaces for communication between computer system 2400 and one or more I/O devices. Computer system 2400 may include one or more of these I/O devices, where appropriate. One or more of these I/O devices may enable communication between a person and computer system 2400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2412 for them. Where appropriate, I/O interface 2412 may include one or more device or software drivers enabling processor 2407 to drive one or more of these I/O devices. I/O interface 2412 may include one or more I/O interfaces 2412, where appropriate. Although this disclosure describes and illustrates a particular I/O interface, this disclosure contemplates any suitable I/O interface.

In particular embodiments, communication interface 2414 includes hardware, software, or both providing one or more interfaces for communication (such as, for example, packet-based communication) between computer system 2400 and one or more other computer systems 2400 or one or more networks. As an example and not by way of limitation, communication interface 2414 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2414 for it. As an example and not by way of limitation, computer system 2400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2400 may include any suitable communication interface 2414 for any of these networks, where appropriate. Communication interface 2414 may include one or more communication interfaces 2414, where appropriate. Although this disclosure describes and illustrates a particular communication interface, this disclosure contemplates any suitable communication interface.

One or more memory buses (which may each include an address bus and a data bus) may couple processor 2407 to memory 2408. Bus 2406 may include one or more memory buses, as described below. In particular embodiments, one or more memory management units (MMUs) reside between processor 2407 and memory 2408 and facilitate accesses to memory 2408 requested by processor 2407. In particular embodiments, memory 2408 includes random access memory (RAM). Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2408 may include one or more memories 2406, where appropriate. Although this disclosure describes and illustrates particular memory, this disclosure contemplates any suitable memory.

Where appropriate, the ROM 2409 may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 2410 may include a hard disk drive (HDD), a floppy disk drive, flash memory, an optical disc, a magneto-optical disc, magnetic tape, or a Universal Serial Bus (USB) drive or a combination of two or more of these. Dynamic storage 2410 may include removable or non-removable (or fixed) media, where appropriate. Dynamic storage 2410 may be internal or external to computer system 2400, where appropriate. This disclosure contemplates mass dynamic storage 2410 taking any suitable physical form. Dynamic storage 2410 may include one or more storage control units facilitating communication between processor 2407 and dynamic storage 2410, where appropriate.

In particular embodiments, bus 2406 includes hardware, software, or both coupling components of computer system 2400 to each other. As an example and not by way of limitation, bus 2406 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2406 may include one or more buses 2406, where appropriate. Although this disclosure describes and illustrates a particular bus, this disclosure contemplates any suitable bus or interconnect.

According particular embodiments, computer system 2400 performs specific operations by processor 2407 executing one or more sequences of one or more instructions contained in memory 2408. Such instructions may be read into memory 2408 from another computer readable/usable medium, such as static storage 2408 or dynamic storage 2410. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 2407 for execution. Such a medium may take many forms, including but not limited to, nonvolatile media and volatile media. Non-volatile media includes, for example, optical or magnetic disks, such as static storage 2408 or dynamic storage 2410. Volatile media includes dynamic memory, such as memory 2408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 2400; in alternative embodiments, two or more computer systems 2400 coupled by communication link 2415 (e.g., LAN, PTSN, or wireless network) may perform the sequence of instructions in coordination with one another.

Computer system 2400 may transmit and receive messages, data, and instructions, including program, i.e., application code, through communication link 2415 and communication interface 2414. Received program code may be executed by processor 2407 as it is received, and/or stored in static storage 2408 or dynamic storage 2410, or other non-volatile storage for later execution. A database 2432, within external storage device 2431, may be used to store data accessible by the system 2400 by way of data interface 2433.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   a processor having programmed instructions to:
   define an operational rule to monitor an operating status of a component, wherein the operational rule is based on a severity level and category and an entity type of a virtualization node, wherein the entity type includes a cluster type, a host type, a virtual machine type, or a container type;
   group exceptions to the operational rule based on similarity and on a per-cluster, per-entity, and per-resource basis;
   associate a notification subscription with the operational rule;
   initiate an alert upon determining that data associated with the operating status of the component satisfies the operational rule;
   in response to initiating the alert, display information associated with the alert in a graphical user interface, wherein the information displayed includes a root cause analysis identifying a cause of the alert, a recommendation for resolving the alert, and detailed actions to carry out the recommendation; and
   send a notification of the alert to a recipient based upon the alert satisfying a condition defined in the notification subscription.

2. The apparatus of claim 1, wherein the operational rule comprises an exception defining an exception condition for a first component, and wherein the alert is initiated for the first component when the exception condition is satisfied.

3. The apparatus of claim 1, wherein the condition defined in the notification subscription is based upon the severity level, the category, or an originating component of the alert.

4. The apparatus of claim 1, wherein the severity level comprises a critical level and a warning level, and wherein each of the critical level and the warning level is associated with a default value.

5. The apparatus of claim 4, wherein the default value of at least one of the critical level and the warning level is changeable to a user-defined value.

6. A method comprising:
   defining a monitoring policy comprising an operational rule for monitoring an operating status of a component, wherein the operational rule is based on a severity level and category and an entity type of a virtualization node, wherein the entity type includes a cluster type, a host type, a virtual machine type, or a container type;
   grouping exceptions to the operational rule based on similarity and a per-cluster, per-entity, and per-resource basis;
   associating a notification subscription with the operational rule;
   determining that data associated with the operating status of the component satisfies the operational rule and initiating an alert in response;
   displaying information associated with the alert in a graphical user interface, wherein the information displayed includes a root cause analysis identifying a cause of the alert, a recommendation for resolving the alert, and detailed actions to carry out the recommendation; and
   sending a notification of the alert to a recipient based upon the alert satisfying a condition defined in the notification subscription.

7. The method of claim 6, wherein the operational rule comprises an exception defining an exception condition for a first component, and wherein the alert is initiated for the first component when the exception condition is satisfied.

8. The method of claim 6, wherein the information associated with the alert is displayed in the graphical user interface on a per-cluster, per-entity, and per-resource basis.

9. The method of claim 6, further comprising:
   associating a first severity condition with the notification subscription of the operational rule and associating a first notification mechanism with the notification subscription for notifying a first recipient; and
   sending the notification to the first recipient using the first notification mechanism upon the alert satisfying the first severity condition.

10. The method of claim 9, further comprising:
    associating a second severity condition with the notification subscription of the operational rule and associating a second notification mechanism with the notification subscription for notifying a second recipient; and
    sending the notification to the second recipient using the second notification mechanism upon the alert satisfying the second severity condition.

11. The method of claim 6, further comprising:
    receiving an input via the graphical user interface to modify the operational rule; and
    modifying the operational rule based on the input.

12. A non-transitory computer-readable storage media having computer-readable instructions stored thereon that when executed by a processor cause the processor to:
    define an operational rule to monitor an operating status of a component, wherein the operational rule is based on a severity level and category and an entity type of a virtualization node, wherein the entity type includes a cluster type, a host type, a virtual machine type, or a container type;
    group exceptions to the operational rule based on similarity and on a per-cluster, per-entity, and per-resource basis;
    associate a notification subscription with the operational rule;
    initiate an alert upon determining that data associated with the operating status of the component satisfies the operational rule;
    in response to initiating the alert, display information associated with the alert in a graphical user interface, wherein the information displayed includes a root cause analysis identifying a cause of the alert, a recommendation for resolving the alert, and detailed actions to carry out the recommendation; and
    send a notification of the alert to a recipient based upon the alert satisfying a condition defined in the notification subscription.

13. The apparatus of claim 1, wherein for a same instance of the operational rule, the notification subscription defines a first recipient to receive the notification upon a first condition being satisfied by the alert and a second recipient to receive the notification upon a second condition being satisfied by the alert.

14. The non-transitory computer-readable storage media of claim 12, wherein the condition defined in the notification subscription is based upon the severity level, the category, or an originating component of the alert.

15. The non-transitory computer-readable storage media of claim 12, wherein the operational rule comprises an exception defining an exception condition for a first component, and wherein the alert is initiated for the first component when the exception condition is satisfied.

* * * * *